(12) United States Patent
Nordman et al.

(10) Patent No.: US 7,340,438 B2
(45) Date of Patent: Mar. 4, 2008

(54) METHOD AND APPARATUS FOR MANAGING AND ENFORCING USER PRIVACY

(75) Inventors: Ian Nordman, Söderkulla (FI); Tero Alamäki, Helsinki (FI); Marko Vänskä, Espoo (FI); Mikko Tarkiainen, Espoo (FI); Norbert Gyorbíró, Helsinki (FI); Casper Gripenberg, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/860,605

(22) Filed: May 21, 2001

(65) Prior Publication Data

US 2002/0174073 A1  Nov. 21, 2002

(51) Int. Cl.
*G06Q 99/00* (2006.01)

(52) U.S. Cl. .............. 705/64; 705/74; 705/51; 726/30; 726/27; 726/26

(58) Field of Classification Search ............ 705/50–80; 726/30
See application file for complete search history.

(56) References Cited

U.S. PATENT DOCUMENTS

| | | | |
|---|---|---|---|
| 4,969,096 A | | 11/1990 | Rosen et al. |
| 5,237,157 A | | 8/1993 | Kaplan |
| 5,722,418 A | | 3/1998 | Bro |
| 5,743,054 A | | 4/1998 | Luchetti et al. |
| 5,754,938 A | * | 5/1998 | Herz et al. ............... 725/116 |
| 5,754,939 A | | 5/1998 | Herz et al. |
| 5,815,665 A | * | 9/1998 | Teper et al. ............... 705/26 |
| 5,835,087 A | | 11/1998 | Herz et al. |
| 5,848,396 A | * | 12/1998 | Gerace ..................... 705/10 |
| 5,855,008 A | | 12/1998 | Goldhaber et al. ........ 705/14 |
| 5,873,068 A | | 2/1999 | Beaumont et al. |
| 5,892,900 A | | 4/1999 | Ginter et al. |
| 5,899,025 A | | 5/1999 | Casey et al. |
| 5,901,246 A | | 5/1999 | Hoffberg et al. |
| 5,910,987 A | | 6/1999 | Ginter et al. |
| 5,915,019 A | | 6/1999 | Ginter et al. |
| 5,917,912 A | | 6/1999 | Ginter et al. |

(Continued)

FOREIGN PATENT DOCUMENTS

EP  0 990 972 A1  4/2000

(Continued)

OTHER PUBLICATIONS

"Privacy-enhancing technologies"; XP-002226865; Gabriel Schulz; Oct. 1997; pp. 1-30.

*Primary Examiner*—Jalatee Worjloh
(74) *Attorney, Agent, or Firm*—Morgan & Finnegan LLP

(57) ABSTRACT

A system and method manages and enforces user privacy of user data in a network environment in various manners. The system and method can determine a context for interaction with a party, filter user data to be provided to the party based on the determined context, and transmit the filtered user data to the party. The system and method can further determine an anonymity level at which interaction with the party is to be conducted, and interact with the party at the determined anonymity level. Additionally, to enforce user privacy, a privacy enforcement system can be employed at the receiving party and a trusted supervising authority can be utilized to supervise the access of user data received by the receiving party as well as to provide third party certification.

31 Claims, 23 Drawing Sheets

U.S. PATENT DOCUMENTS

| | | | |
|---|---|---|---|
| 5,949,876 A | 9/1999 | Ginter et al. | |
| 5,963,916 A | 10/1999 | Kaplan | |
| 5,982,891 A | 11/1999 | Ginter et al. | |
| 5,987,440 A * | 11/1999 | O'Neil et al. | 705/44 |
| 6,023,510 A | 2/2000 | Epstein | 380/25 |
| 6,029,195 A | 2/2000 | Herz | |
| 6,047,327 A * | 4/2000 | Tso et al. | 709/232 |
| 6,061,789 A | 5/2000 | Hauser et al. | 713/168 |
| 6,112,181 A | 8/2000 | Shear et al. | 705/1 |
| 6,115,709 A | 9/2000 | Gilmour et al. | |
| 6,134,548 A | 10/2000 | Gottsman et al. | |
| 6,141,760 A | 10/2000 | Abadi et al. | |
| 6,154,783 A | 11/2000 | Gilmour et al. | |
| 6,216,014 B1 | 4/2001 | Proust et al. | 455/558 |
| 6,253,203 B1 * | 6/2001 | O'Flaherty et al. | 707/9 |
| 6,266,704 B1 | 7/2001 | Reed et al. | 709/238 |
| 6,317,718 B1 * | 11/2001 | Fano | 705/1 |
| 6,389,533 B1 | 5/2002 | Davis et al. | 713/162 |
| 6,438,544 B1 * | 8/2002 | Grimmer et al. | 707/5 |
| 6,480,850 B1 * | 11/2002 | Veldhuisen | 707/9 |
| 6,647,270 B1 | 11/2003 | Himmelstein | |
| 6,678,516 B2 | 1/2004 | Nordman et al. | |
| 6,785,551 B1 * | 8/2004 | Richard | 455/456.1 |
| 6,912,398 B1 * | 6/2005 | Domnitz | 455/461 |
| 2001/0011247 A1 * | 8/2001 | O'Flaherty et al. | 705/39 |
| 2001/0044785 A1 * | 11/2001 | Stolfo et al. | 705/74 |
| 2002/0112171 A1 * | 8/2002 | Ginter et al. | 713/185 |
| 2002/0147766 A1 | 10/2002 | Vanska et al. | |
| 2003/0068974 A1 * | 4/2003 | Kanamaluru et al. | 455/3.06 |

FOREIGN PATENT DOCUMENTS

| | | | |
|---|---|---|---|
| EP | 1 086 732 A1 | | 3/2001 |
| WO | WO 98/19224 | * | 5/1998 |
| WO | WO 99/44159 | | 9/1999 |
| WO | WO 00/04730 | | 1/2000 |
| WO | WO 00/59286 | | 10/2000 |
| WO | WO 00/60435 | | 10/2000 |
| WO | WO 01/27724 A1 | | 4/2001 |

* cited by examiner

PROFILE DATA 576

| SERVICE CONTRACT 705 | CATEGORY 710 | VIEWPOINT ID 715 | PROFILE ITEMS 720 |
|---|---|---|---|
| | SHOPPING | 1111 | SHOPPING LIST<br>LIKES AND/OR DISLIKES<br>USUAL BUYING<br>CREDIT CARD NUMBER |
| | MEETING | 2222 | NAME<br>TITLE<br>OCCUPATION<br>PROFESSIONAL<br>SKILLS AND COMPETENCIES |
| | EMERGENCY | 3333 | NAME<br>BLOOD TYPE<br>EFFECTING ILLNESSES<br>ALLERGIES<br>RELIGION/CONVICTION<br>HOME ADDRESS<br>NEXT-OF-KIN (CONTACT INFO OF NEAREST RELATIVE)<br>SOCIAL SECURITY |
| | DOCTOR VISIT | 4444 | BLOOD PRESSURE (FOR LONGER PERIOD)<br>BLOOD COUNTS (FOR LONGER PERIOD)<br>BODY TEMPERATURE (FOR LONGER PERIOD)<br>HEART RATE (FOR LONGER PERIOD)<br>FAVORITE THINGS TO DO /HOBBIES |
| | MUSIC BAR/ WITH FRIENDS | 5555 | MARITAL STATUS<br>FAVOURITE MUSIC<br>AREAS OF INTEREST |
| BANK A | | 6666 | NAME<br>BANK ACCOUNT NO.<br>FINANCIAL INTERESTS<br>BANKING SERVICES |

FIG. 7A

PROFILE ACCESS
AUTHORITY DATABASE
378

| SERVICE CONTRACT 705 | CATEGORY 710 | VIEWPOINT ID 715 |
|---|---|---|
|  | SHOPPING | 1111 |
|  | MEETING | 2222 |
|  | EMERGENCY | 3333 |
|  | DOCTOR VISIT | 4444 |
|  | MUSIC BAR/ WITH FRIENDS | 5555 |
| BANK A |  | 6666 |

TRANSACTION LOG 1500

| OBJECT IDENTIFIER 1505 | TRANSACTION DATE/TIME 1510 | VIEWPOINT IDENTIFIER 1515 | SUPERVISING AUTHORITY IDENTIFIER 1520 |
|---|---|---|---|
| JOHN SMITH ID NO. 42421 | 1/2/96 11:00 PM | 1111 | SERVER 123 |
| | 5/1/96 11:00 PM | 2222 | SERVER 123 |
| | 5/3/96 11:00 PM | 5555 | SERVER 123 |
| | 6/24/96 11:00 PM | 3333 | SERVER 123 |
| SERVICE PROVIDER ID NO. 232323 | 1/7/96 11:00 PM | 6666 | SERVER 222 |
| | 5/8/96 11:00 PM | 5555 | SERVER 222 |
| | 5/3/96 11:00 PM | 1111 | SERVER 222 |
| [...] | [...] | [...] | [...] |

METHOD AND APPARATUS FOR MANAGING AND ENFORCING USER PRIVACY

BACKGROUND OF THE INVENTION

1. Technical Field

The present invention is related to a method and system for managing user privacy and, more particularly, to managing and enforcing privacy of user data in a network environment.

2. Art Background

With the growth of electronic communications, interaction and commerce, privacy has become a major concern, particularly since more people are relying on their portable devices to maintain personal and confidential information. Generally, the privacy issue can be separated into two aspects, namely visibility and awareness.

Visibility of an object means that the environment can recognize the object and interact with it as needed. Visibility is a means of informing other objects about the existence and possibilities related to the object. The manner in which the object is perceived and understood is dependent on its visibility, and the object's visibility impacts other objects' visibility. For example, as the visibility of the object increases, the openness of communications by other parties with it increases as well as the ability by such parties to provide greater personalized service. On the other hand, increased visibility also places the object at greater risk, such as disclosing too much information in the wrong circumstances or disclosing information to the wrong objects. There is a need to provide objects with greater control over their visibility.

Awareness is the counterpart of visibility. The awareness of an object is a direct or indirect consequence of the other object's visibility. Awareness is limited to the information provided by the other object. As with visibility, there is a need to provide objects with greater control over their awareness by other objects.

Various consumer studies indicate that people have become increasingly concerned about their personal data in a networked environment, such as the Internet. Particularly, people feel that they have lost control of how their information is collected and used, and would like to regain control over their information. For example, once personal information is disclosed to another party, control of the information is relinquished to the receiving party. As such trust plays a major factor in how much information one party is willing to provide to another.

SUMMARY

In accordance with one advantageous embodiment, there is provided a system and method of managing user privacy of a user operating a user device such as a wireless device in a network environment. The system and method involve determining a context for interaction with a party; filtering user data, such as personal assets, to be provided to the party based on the determined context; and transmitting the filtered user data to the party.

The context can be determined based on user input; a pattern of prior actions by the user (e.g., transactional history, habit, predisposition and profile of the user); information provided by the party interacting with the user which may include a service category, a service description, a requested viewpoint and/or an identity of the party; information provided by a context beacon in a vicinity of the user, an agreement between the user and the party which defines a subset of user data to be provided to the party; information sensed by sensors such as a positioning sensor, touch sensor, audio sensor, compass sensor, ambient light sensor, ambient temperature sensor and three-axis acceleration sensor. The context can be dynamically determined based upon an environment of the user device which may change over time.

The filtering of user data may involve predefining contexts which are associated with one or more predefined subsets of the user data. Accordingly, the appropriate subset(s) may be provided to another party based on the applicable determined context.

The method and system may further involve determining an anonymity level at which interaction with the party is to be conducted; and interacting with the party at the determined anonymity level. The anonymity level can be selected from one of Anonymous, Pseudonymous, Anonymous transaction and Authenticated.

The method and system may further involve authenticating whether the party is under supervision by a trusted supervising authority, the supervising authority supervising enforcement of access rights to user data received by the party; and providing user information to the party if the party is authenticated as being one under the supervision of the supervising authority. The authentication may include receiving a privacy enforcement certificate associated with the supervising authority from the party; and verifying the authenticity of the privacy enforcement certificate.

As another privacy feature, rights management rules defining access rights by the party may be associated with the filtered user data provided to the party. These rules can be attached with the filtered user data provided to the party. The rights management rules define access limitations, such as a number of accesses, a time duration or expiration, a particular party and a particular use, and/or define when the filtered user data is to be deleted. For example, the filtered user data provided to the party can be deleted upon one of a predetermined number of accesses, a predetermined time duration, detection of impermissible use, detection of a violation of rights management rules and de-certification of the party as privacy enforcement certified.

Furthermore, the system and method may involve the maintenance of a log of user data provided to another party.

In accordance with another advantageous embodiment, there is provided a system and method of managing user privacy of a user in a network environment. The system and method may involve determining a context for interaction with a party; determining an anonymity level at which interaction with the party is to be conducted; and interacting with the party at the determined anonymity level.

In accordance with a further advantageous embodiment, there is provided a system and method of managing user privacy of a user in a network environment. The system and method involve establishing communications with a party; authenticating whether the party is under supervision by a trusted supervising authority, the supervising authority supervising enforcement of access rights to user information received by the party; and providing user data to the party if the party is authenticated as being under the supervision of the supervising authority.

In accordance with a further advantageous embodiment, there is provided a system and method of managing privacy of user data received from a wireless device of the user at a receiving party. The system and method involve receiving personal assets including rights management rules from a wireless device of the user; storing the personal assets in a storage facility; and providing a privacy enforcement software layer between the application program interfaces of the receiving party and the stored personal assets to restrict access by the application program interfaces to the personal assets according to the rights management rules. The received personal assets and the rights management rules can be encrypted.

The rights management rules can define access limitations, such as a number of accesses, a time duration or expiration, a particular party and a particular use, or define when the stored personal asserts are be deleted from the storage facility.

The privacy enforcement software and the storage facility can be a sealed black box.

The system and method may also involve employing a supervising authority, in communications with the receiving party, for supervising enforcement of the rights management rules over the stored personal assets. The supervising authority can be a certification authority.

In accordance with another advantageous embodiment, there is provided a system and method of employing a trusted third party in managing privacy over user data provided from a user device of a user to a receiving party. The system and method involve maintaining personal assets including rights management rules from a wireless device of the user at the receiving party; and employing a supervising authority, in communications with the receiving party, for supervising enforcement of the rights management rules over the stored personal assets.

The supervising authority may inform the user with a status of the stored personal assets of the user. The status information may identify unauthorized access of the stored personal assets and/or accesses conducted by the party. The supervising authority can also change the stored personal assets based upon a request from the user, delete the stored personal assets based upon a request from the user, and inform the user of the identity of stored personal assets of the user.

In accordance with yet an additional advantageous embodiment, there is provided a system for managing and enforcing privacy of data of a user in a network environment. The system includes a user device, operated by a user, for interacting with and providing user data to one or more objects. The user data has rights management rules associated therewith defining access rights to the user data. The system also includes an object (e.g., service provider) for interacting with the user device and receiving user data, and a supervising authority for supervising enforcement of the rights management rules over the received user data. A network environment is provided to enable interaction between the user device, the object and the supervising authority.

The supervising authority can also be certification authority for certifying that the object is under supervision by the supervising authority.

In accordance with further advantageous embodiments, the various methods and processes discussed above and below may be implemented on a computer through use of a computer program stored on a computer-readable medium. For example, a computer-readable medium may be encoded with processing instructions for implementing such methods and processes to be performed by the computer.

BRIEF DESCRIPTION OF THE DRAWINGS

FIG. 7A is an example of information maintained in a profile database by a profile operator;

FIG. 7B is an example of information maintained in a profile access authority database of a user device;

FIG. 15 is an example of information maintained in a transaction log by the user.

DETAILED DESCRIPTION OF THE PREFERRED EMBODIMENTS

The present invention is generally directed to a method and system for providing a user greater control over privacy. Privacy may involve the privacy of personal information such as the collection and handling of personal data, the privacy of the person or bodily privacy involving the integrity of a persons physical body, privacy of communications such as the security and privacy of mail, telephones, e-mail and other forms of communication; and territorial privacy such as the limits on intrusion into the domestic and other environments.

In regard to visibility and awareness, privacy is a control of what information is revealed about oneself and to whom it is revealed, and privacy is the interest that individuals have in sustaining a personal space that is free from other people and organizations. Privacy plays a significant role particularly in a networked environment. Privacy ensures a party's right to control its assets and provides means for the party to act based on its own interests and needs. Privacy can be understood as a protecting layer between a party and an external network in being visible and in being aware.

Figure 1A:
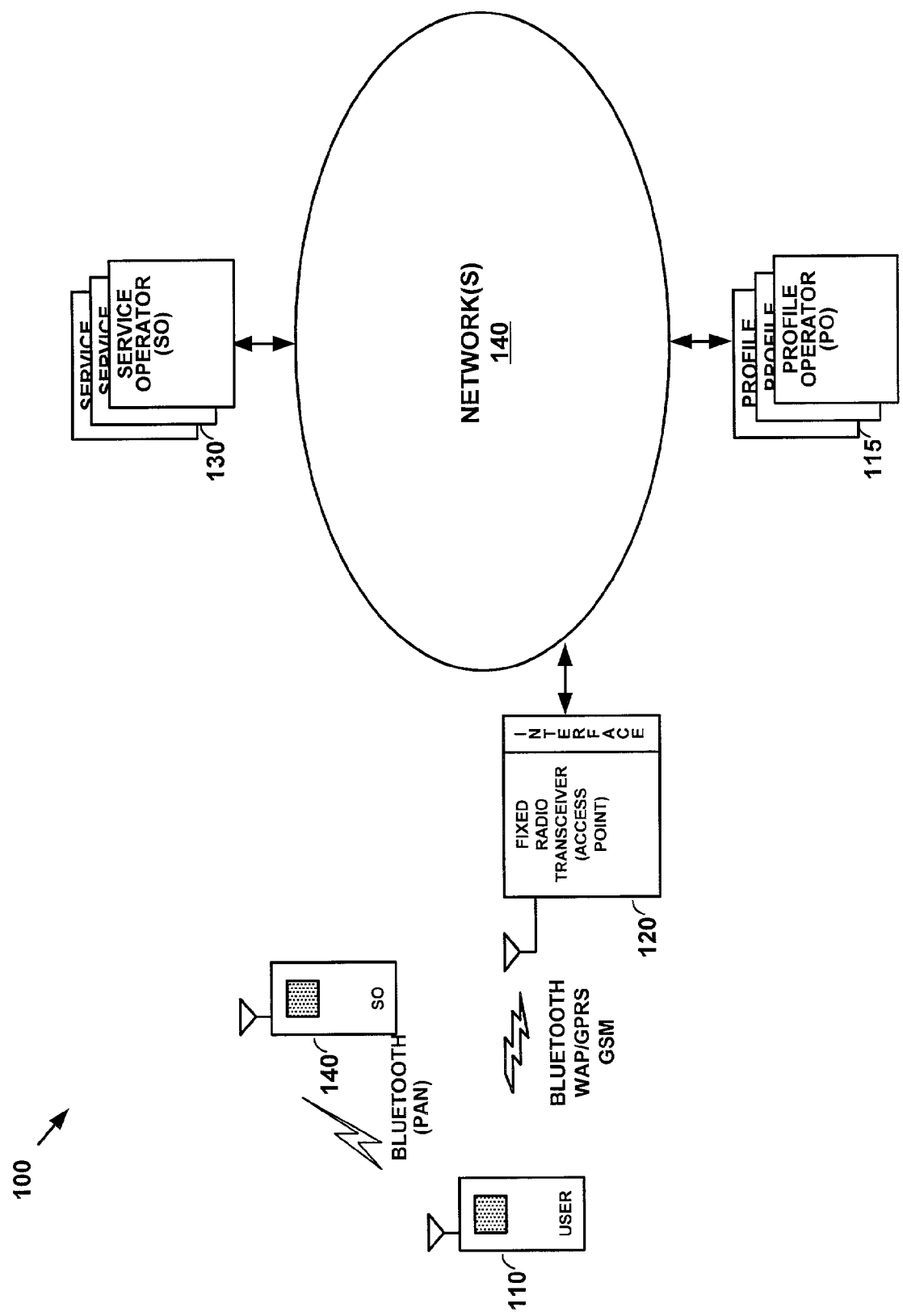
FIG. 1A is an overview of a network system for enabling a user of a communication device to control a privacy level of communications with other parties and to control access and usage of the user's profile information by other parties in accordance with an advantageous embodiment.
Figure 1B:
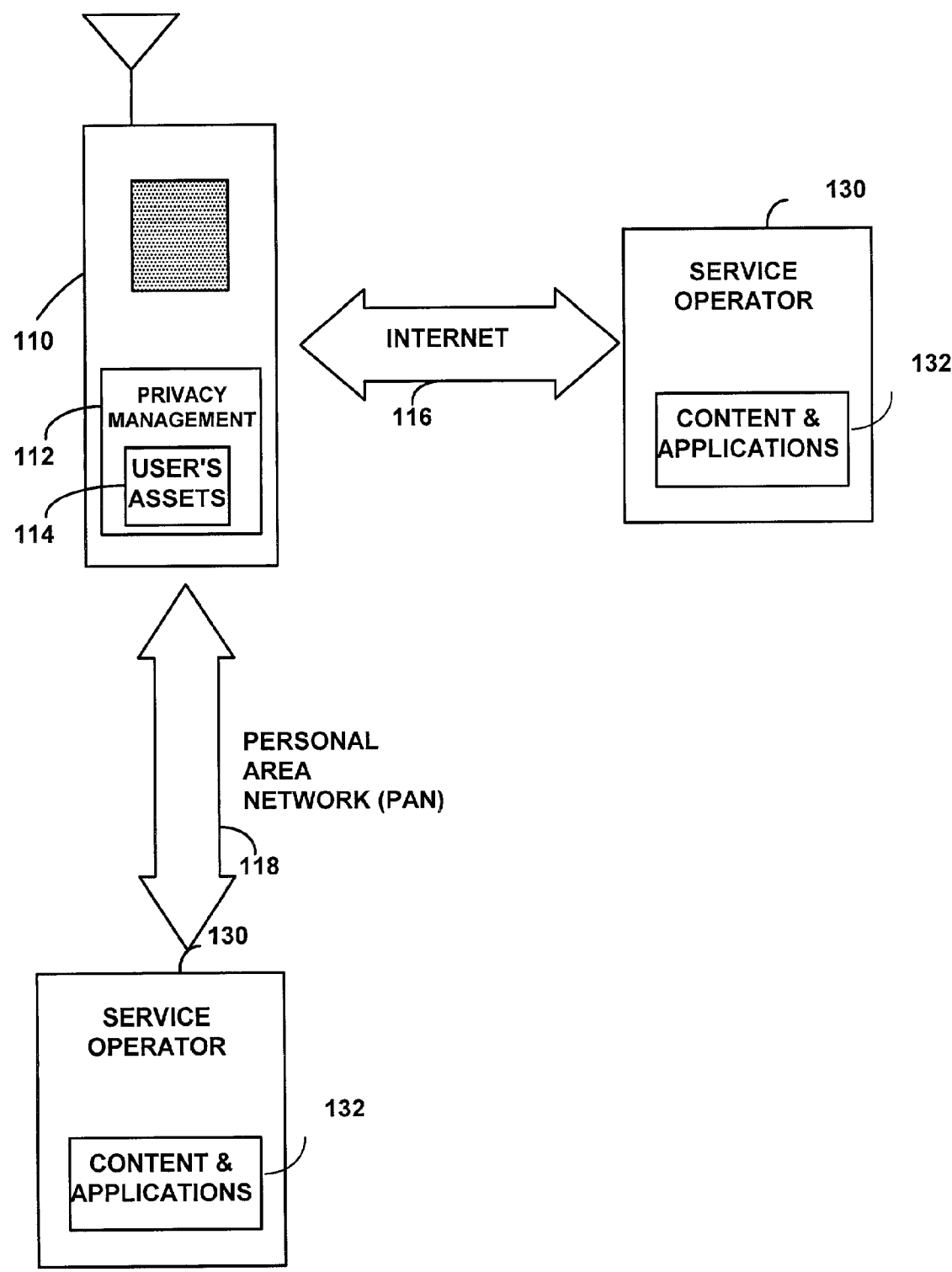
FIG. 1B is a general overview of an example of different network arrangements between a user device and a service operator in the network system of FIG. 1A.

FIGS. 1A and 1B show an overview of a network system 100 for enabling a user of a communication device to control a privacy level of the user's communications with other parties and to control access and usage of user assets, such as user's profile information, by other parties in accordance with an advantageous embodiment of the present invention.

Network system 100 includes a user device 110 operated by a user, profile operator(s) 115 for maintaining the user's profile information, and a service operator(s) 130 for providing services to the user. User device 110, profile operator 115 and service operator 130 communicate with each other across network(s) 140. A radio transceiver 120 provides an access point to enable the user to conduct communications across network(s) 140. Network 140 may be a local area network(s) (LAN), wide area network(s) (WAN), the Internet, wireless network(s) or a combination thereof. Radio transceiver 120 may be, for example, a radio tower, a general packet radio service (GPRS) access point, a general system for mobile communications (GSM) access point or a fixed position wireless device implementing the Bluetooth™ standard. ("Bluetooth" is a trademark owned by Telefonaktielbolaget L M Ericsson, Sweden.). A detailed discussion of Bluetooth technology will be discussed below with reference to FIG. 2.

User device 110 may be any computerized system with communication means by which to conduct wire and wireless communications with other parties, such as service operator 130 and profile operator 110. In various embodiments, user device 110 may take the form of computer system or a mobile wireless device configured to perform the methods and processes discussed herein. For example, user device 110 may be a cellular phone, personal digital assistant (PDA), portable computer, handheld device, etc.

A wireless user device may employ the Nokia WAP Client Version 2.0 which is a software product containing components to implement WAP Client thereon. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless Personal Digital Assistants (PDAs). Application programs stored in the wireless user device interact with the WAP Client to implement a variety of communications applications.

The WAP Client includes the wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client, which includes security features, such as public and private keys and service certificates, needed for user authentication and digital signatures. Additionally, it has the ability to perform cryptographical operations to encrypt and decrypt messages.

The types of wireless networks supported by the WAP standard include Cellular Digital Packet Data (CDPD), Code-Division Multiple Access (CDMA), Global System for Mobile Communication (GSM), Time Division Multiple Access (TDMA), GPRS, 3G-Broadband, and the like.

Service operator 130 may be any computerized system with communication means by which to conduct wire and wireless communications with other parties, such as user device 110 and profile operator 115. In various embodiments, service operator 130 may take the form of a server or computer system or a fixed or mobile wireless device configured to perform the methods and processes discussed herein. For example, service operator 130 may be a server of a retailer or a cellular phone, personal digital assistant (PDA), portable computer, handheld device, etc.

Profile operator 130 may be any computerized system with communication means by which to conduct wire and wireless communications with other parties, such as user device 110 and service operator 130. In various embodiments, profile operator 115 may take the form either as a server or computer system or a fixed or mobile wireless device configured to perform the methods and processes discussed herein.

As shown in FIG. 1A, user device 110 may conduct communications with service operator 130 or profile operator 115 using Bluetooth technology or general packet radio service (GPRS) or general system for mobile communications (GSM) or other wireless network communications, or may conduct communications with a mobile service operator 140 using Bluetooth technology or the like to establish a personal area network (PAN).

[1] In accordance with one embodiment, user device 110 is configured to control a privacy level of communications with another party, such as a service operator. The user or user device 110 on behalf of the user may determine which level of privacy should be maintained in an ad hoc or user initiated communications environment. In such environment, user device 110 may conduct the communications with another party at varied privacy levels, such as absolute anonymity (e.g., without any provision of a user identifier to the communicating party), with pseudonymity (e.g., with the use of a pseudonym) or with authenticated user identification. User device 110 may be set to operate at a default privacy level of anonymous.

For example, in a service environment, user device 110 may control the privacy level of communications with another party, such as service operator 130. The privacy level may be determined based on a user request or automatically based on the nature of the circumstances surrounding the communications. In the automatic implementation, user device 110 may adjust a privacy level, for example, based on the nature of the service negotiations with another party (e.g., service category or context), the level of privacy in one or more prior transactions with the specific service operator, the identity of service operator 130, user-defined situations, the user's prior behavior or activity (e.g., profile), and so forth. For the purposes of illustration, the service negotiations may be divided into four layers, i.e., layers one, two, three and four.

The first negotiation layer may involve an initial service inquiry or discovery, which does not require any identification of a user, e.g., a user ID. This may simply involve user device 110 scanning the environment in a very light and privacy protected way, and obtaining a response from service operator 130. The response may include a service name or identifier, type and definition. Such a negotiation generally occurs automatically without user interactions.

The second negotiation layer may involve, for example, the provision of user profile information to service operator 130 for service personalization. In this situation, user device 110 may provide service operator 130 with a pseudonym identifier. This identifier may be generated on a per session basis when conducting communications with service operator 130 (i.e., a session ID). In this way, service operators are prevented from collecting profile information individually for each customer.

The third negotiation layer may involve, for example, anonymous service delivery which may also include anonymous payment possibilities. In certain circumstances, service may still be rendered by service operator 130 without any need to disclose the identity of the user. For example, a user may conduct an anonymous service transaction to purchase an item at a point-of-sale. Anonymous payment may also be provided through an entrusted third party, such as profile operator 115.

The fourth negotiation layer may involve circumstances in which it is necessary for the user to provide identity authentication and user identification to obtain a service. One example would be where the user is accessing his/her banking service or other financial services. Additionally, some service providers may simply require the full identity of the user in negotiating services.

User device 110 may perform privacy level determinations and changes at anytime, e.g., prior to, during or after a communication with another party, such as service operator 110. As discussed above, user device 110 may initiate such determinations and changes upon a user request or automatically. Privacy level determinations and changes may also be based on a nature, circumstances or context of communication with another party. In certain contexts, a user may maintain anonymity, such as prior to authentication of the other party and clarification as to the purpose of communication with the other party. In other contexts, the user may need to be authenticated and identified securely, such as with financial transactions, etc. Accordingly, user device 110 may be configured to dynamically modify a privacy level according to changes in "context" or circumstances when interacting with another party. Various exemplary approaches to implement context determination are discussed further below.

[2] In accordance with another advantageous embodiment, user device 110 may also control access and usage of the user's profile information (or generally user assets or private user data) by other parties depending upon the nature, circumstances or context of the communications with those parties. For example, in a service environment, user device 110 recognizes one or more service opportunities of service operator 130, and determines a profile access authority or level to identify subsets or viewpoints of profile information which the service operator may access or obtain. The access level may be determined according to the context or circumstances.

Accordingly, user device 110 may be configured to dynamically change access and usage of the user's profile information according to changes in "context" or circumstances when interacting with another party. Various exemplary approaches to implement context determination are discussed immediately below.

[3] In accordance with a further advantageous embodiment, the context of a communication may be determined or predicted in various manners, for example, based on:

(a) information provided by the user which may be requested from the user by the user device;

(b) information associated with the user, such a pattern of prior activity by the user which may be a transactional history, habit, predisposition, profile, etc. of the user;

(c) information provided by ambient objects or "context beacons" (which may be in a vicinity of the user);

(d) information provided by another party, such as service-related information provided by service operator 130, which may include a service category, service description, requested viewpoint, service operator identifier and so forth;

(e) a user's pre-existing relationship (e.g., contract) with the service operator to provide an agreed upon or predefined subset or viewpoint of profile information;

(f) information sensed by sensors (e.g., positioning sensor such as GPS or radio beacon triangulation sensor, touch sensor, audio sensor, compass sensor, ambient light sensor, ambient temperature sensor, three-axis acceleration sensor, etc.) located in the user device or in the environment; and (e) any other relevant information which can be used to determine or predict a context.

Regarding sensor-based information, such information may be employed to characterize a current environment of the user device and, as such, may be employed to determine a context and circumstance for use in privacy control.

Accordingly, a user's device may be configured to determine or predict the context based on user input, on information provided by another party, on information provided by ambient objects or context beacons, on sensing information concerning the general environment (e.g., physical environment, user conduct, time, etc.) of the user device, on a pattern of prior user activities, or any relevant information which may be employed to predict or determine a context.

[4] In accordance with another advantageous embodiment, the various parties (e.g., user, service provider, etc.) are configured to interact with each other based on predefined and standardized contexts and asset subsets or viewpoints. Such an arrangement provides an efficient approach to allow parties to conduct service interaction (e.g., service negotiation, service session, etc.) at agreed upon anonymity levels and to filter user information (e.g., user assets) to be provided to other parties to increase user privacy. In this way, a user can reduce an amount/type of information (e.g., identity, user assets, etc.) provided to other parties, as necessary, based on the context, circumstances, etc. An example of such predefined and standardized contexts and asset subsets or viewpoints are discussed below with reference to FIG. 7A.

[5] In a further embodiment, the profile access control may be distributed between user device 110 (e.g., a mobile wireless device) and profile operator 115 (e.g., a server). In this case, profile operator 115 maintains the user's profile information. User device 110 may determine a profile access level to the user's profile information and transmit the access authority to service operator 130 which, in turn, requests and receives a subset of profile information from profile operator 115 according to the determined access authority.

In addition to distributing the functionality and capacity burdens associated with controlling access to a user's profile information, other functions and capacity burdens may be also be distributed to decrease the work load on the user device while providing additional functionality through the use of a partner computing system or server, such as profile server 115. Such an arrangement may be generally referred to as the "hybrid-terminal model".

The idea is that a future handset is closer to a "dummy" X terminal than a "smart device" in the sense that the computational power and "intelligence" resides in the network, i.e., at a network-based server. This means that the majority of the storage capacity, as well as the computational capacity, would be stored in the network.

At the network-based server, the following examples of functions and features may be provided:
- User profile and preferences, such as described above in connection with a Profile Operator
- Calendar and other basic software with their user-specific data (synchronizable between multiple devices, e.g., download, update, use)
- MIDI and other ringing tone library
- Video and image library
- Software library At the handset, the following examples of functions and features may be provided:
- Synchronizable copies of changing/updating information (calendar etc.)
- Desired parts of ringing tone, etc., libraries as local copies, others downloadable
- Required parts of the user profile or references/access rights information for different services All the above would provide clear benefits for both the user, the device manufacturer and the service operator. For the user, it would mean that he/she would have access to the same information with all his/her devices, and he/she could benefit from the same personalization features. Also, with all of the new capacity and features, the device would still remain very small. For the device manufacturer, the hybrid terminal would offer possibilities to increase the terminal functionality without having to overcome the challenges of optimizing code for small footprint software, tacking issues such as memory requirements and device size, computational power, etc. Server-side part of the hybrid terminal would also probably lower the threshold of buying a new design device (or several devices), if maintaining and synchronizing the data does not prove to be too problematic. For service providers and other companies this would mean great possibilities to offer server-side software and, e.g., to act as trusted third-parties to maintain the personal server-side information (profiles, visibility rules, etc.) for each user.

In practice, when the user purchases a first handset (e.g., a mobile phone), the user would be provided server-side functionality and capacity including, for example, calendar, basic software, etc. The user may activate these functions through an agreement with a service operator. After activating the hybrid terminal, the user can select (to some extent based on the operator) the services and service providers the user wishes to use (e.g., profiling, additional software etc.).

[6] In accordance with yet a further advantageous embodiment, user device may be configured to track the user information provided to other parties over time. This may involve, for example, the maintenance of a log which may include the identity of one or more other parties, associated transactions (e.g., transaction identifier and date/time of transaction), transmitted user information (e.g., context, viewpoints, subset of user assets, etc.), rights management rules (to be discussed below) associated with the transmitted user information, and so forth. In this way, the user can ascertain how much information a particular party or a group of parties have received over time and, accordingly, trace its visibility. An example of such a log is discussed below with reference to FIG. 15.

[7] In accordance with another advantageous embodiment, a method and system is provided to enforce privacy of user information after the user has provided such information to another party. For example, the information receiving parties, such as service provider 130, may include a privacy enforcement system which may take the form of a "sealed black box" or a limited access database for providing temporary storage of user information and enforcement application(s) for controlling access, usage, deletion, modification and update of the user information. For example, the "sealed black box" may include a black box firewall to prevent unauthorized access to user information. The enforcement application program interface(s) may be configured to control selectively access including the usage, deletion, modification and update of received user information (from one or more parties) according to rights management rules of the user(s).

Such a distributed arrangement is particularly useful when employed with mobile devices for similar reasons as discussed above concerning the use of a profile operator.

[8] In accordance with a further advantageous embodiment, a supervising authority, such as a trusted third party, may supervise the enforcement of the rights management rules over access to user information maintained by one or more receiving parties. The supervising authority (e.g., a trusted server or computer, trusted third party, etc.) may be provided with a communication link, such as an online connection, with the receiving party and/or the "sealed black box" or limited access database. In this way, the supervising authority may monitor stored user information at a site and accordingly, directly or indirectly, enforce the rights management rules or monitor the use and maintenance of user information by the receiving party.

[9] In accordance with still yet another advantageous embodiment, the supervising authority may also act as a third party certification authority (CA) which provides certification or digital certificates to certify that a particular party is under the supervision of the supervising authority or some other trusted supervising authority. This form of certification is generally referred herein as privacy enforcement certification (PEC), and a certified party is generally referred herein as being privacy enforcement certified. Such certification provides a user with the added security that a party requesting user data is under supervision by some trusted third party.

Accordingly, during communications between two or more parties, such third party certificates may be exchanged and verified to ensure that the parties are privacy enforcement certified. Such authentication may be a prerequisite to conducting a session with another party or to transmitting user data to another party.

The above and other advantageous embodiments will be discussed in further detail below with reference to the figures.

Turning again to the figures, FIG. 1B is a general overview of an example of a network relationship between user device 110 and service operator 130 in accordance with one advantageous embodiment. User device 110 may be a wireless device capable of conducting communications and service negotiations with service operator 130 over the Internet 116 or a personal area network (PAN) 118.

Service operator 130 may be a fixed or mobile wireless device or a server including content and application programs 132 for performing service negotiations with the user and providing a variety of services to the user. The manner in which service negotiations is performed with user device 110 is discussed in further detail below with reference to FIGS. 8A through 8D and FIG. 13.

User device 110 may include a privacy management application program 112 for controlling the privacy levels (e.g., Anonymous, Pseudonymous, Anonymous transaction and Authenticated) at which the user conducts service-related communications with the service operator. As discussed above, the privacy level may be determined based on a user request or automatically based on the nature of the circumstances surrounding the communications. In the automatic implementation, user device 110 may adjust a privacy level, for example, based on the nature of the service negotiations with another party (e.g., service category or context), the level of privacy in one or more prior transactions with the specific service operator, the identity of service operator 130, user-defined situations, the user's prior behavior or activity (e.g., profile), and so forth. As one example, in a medical emergency, communications with the user's doctor would most likely be conducted on an authenticated basis.

Figure 2:
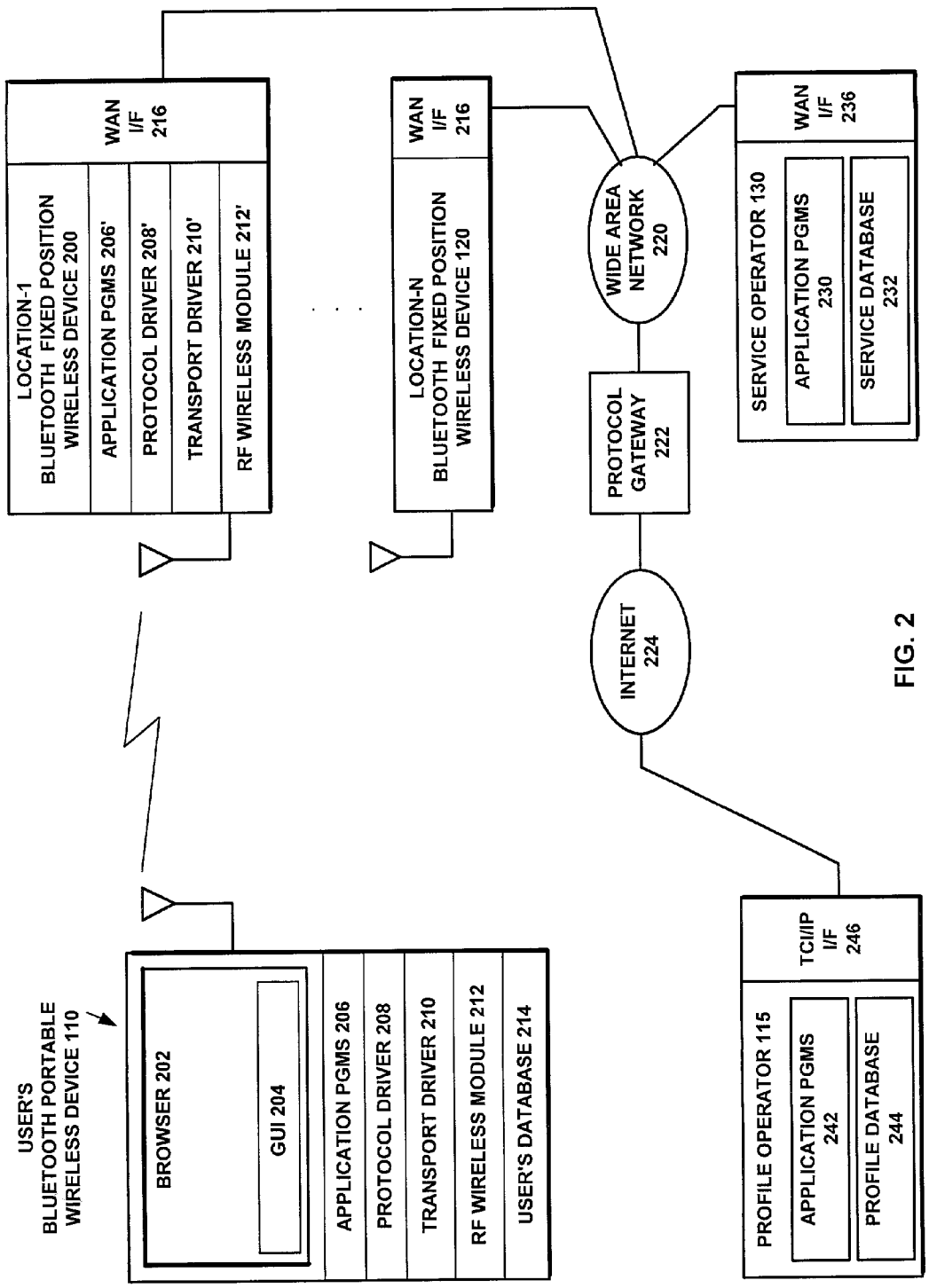
FIG. 2 is a block diagram of one example of the network system of FIG. 1A in which a user employs a Bluetooth-enabled mobile device to conduct service-related communications with a service operator through a fixed position Bluetooth-enabled wireless device.

FIG. 2 illustrates one example of a pervasive computing network system implementing the Bluetooth standard. The Bluetooth standard is a short-range wireless communication industry specification that allows portable, personal devices to interact which each other and other stationary devices. The Bluetooth standard uses the spread spectrum radio frequency and provides omnidirectional multiple connections without requiring communicating devices to be in line of sight. The maximum range is 10 meters, but it can be extended to 100 meters by increasing the power. When one Bluetooth device comes within range of another, they automatically exchange address and capability details. They can then establish a 1-megabit/second link with security and error correction. The device's radio operates on the globally available, unlicensed 2.45 GHz radio band, and supports data speeds of up to 721 Kbps. Each device has a unique 48-bit address similar to that provided in the IEEE 802 standard. Connections can be point-to-point or multipoint. Bluetooth devices are protected from radio interference by changing their frequencies randomly up to a maximum of 1600 times per second, using a frequency hopping protocol. They also use three different but complimentary error correction schemes. Built-in encryption and verification are provided. Bluetooth devices provide a universal bridge to existing data networks, a peripheral interface, and a mechanism to form small private ad hoc groupings of connected devices away from fixed network infrastructures. Bluetooth radio modules avoid interference from other signals by hopping to a new frequency after transmitting or receiving a packet.

The Bluetooth specification is a de facto standard containing the information required to ensure that diverse devices supporting the Bluetooth wireless technology can communicate with each other worldwide. The document is divided into two parts: Volume 1: Core, and Volume 2: Profiles. The Core part specifies components such as the radio, baseband, link manager, service discovery protocol, transport layer, and interoperability with different communication protocols. The Profiles part specifies the protocols and procedures required for different types of Bluetooth applications. A copy of the Bluetooth Specification can be downloaded from the Internet web site. Additional information is provided in the book by Nathan J. Muller entitled "Bluetooth Demystified", published by McGraw Hill, 2000 (ISBN 007-1363238).

In the network diagram of FIG. 2, an exemplary relationship is shown between a Bluetooth-enabled user device 110, a service provider's Bluetooth-enabled fixed position wireless device(s) 200 (hereinafter "fixed position device 200") and service operator 130, and profile operator 115. Fixed position device 200, for example, may be arranged in a store to provide location-based shopping services or other services to the user.

User device 110 is shown having the form of a hand-held personal digital communicator, with an LCD display and a touch overlay screen to enable inputting commands to the microbrowser 202 by touching the portion of the screen displaying the appropriate input button. User device 110 includes a programmed central processor, a memory, at least a few alphanumeric input keys, and an RF wireless transceiver module 212. The memory of the user device 110 stores application programs 206, protocol driver 208, transport driver 210, and a user's database or assets 214.

User device 110 receives and sends data over a short radio link with fixed position device 200, for example. Microbrowser 202 displays a graphical user interface (GUI) 204 to enable the user to navigate through the pages of data being displayed and to select options that are presented by the microbrowser 202.

The Wireless Application Protocol (WAP) standard can be used in the application program layer 206 of user device 110, to provide functionality for the device's microbrowser 202. User device 110 accesses a small file called a deck which is composed of several smaller pages called cards which are small enough to fit into the display area of the device's microbrowser 202. The small size of the microbrowser 202 and the small file sizes accommodate the low memory constraints of the Bluetooth-enabled user device 110 and the low-bandwidth constraints of a wireless network. The cards are written in the Wireless Markup Language (WML) which is specifically devised for small screens and one-hand navigation without a keyboard. The WML language is scaleable from two-line text displays on a small screen microbrowser 202, up through graphic screens such as are found on personal communicators. The cards written in the WML language can include programs written in WMLScript, which is similar to JavaScript, but makes minimal demands on memory and CPU power of the user device 110 because it does not contain many of the unnecessary functions found in other scripting languages.

User device 110 includes a user database or assets 214 that stores the user's private data. Such data may include, for example, a profile access authority database 378, captured profile-relating information, privacy level parameters for identifying various situations requiring different privacy levels, and so forth.

Application programs 206 in user device 110 are described in part below with reference to the flow diagrams of FIGS. 8A through 8D and the program descriptions to be provided below with reference to FIGS. 3A through 3C.

Protocol driver 208 in user device 110 includes the Bluetooth core protocols of Baseband, Link Manager Protocol (LMP), Logical Link Control and Adaptation Protocol (L2CAP), and Service Discovery Protocol (SDP) and the Bluetooth serial cable emulation protocol (RFCOMM). The Baseband and Link Control layers enable the physical RF link through RF wireless module 212, between the Bluetooth devices 110 and 200 forming a piconet RF network, coordinating the frequency-hopping spread spectrum system in which packets are transmitted in defined time slots on defined frequencies. A piconet RF network consists of one master Bluetooth device and up to seven active member Bluetooth devices. A Bluetooth network of multiple piconets is called a scattemet. The Link Manager Protocol (LMP) sets up the links between the Bluetooth devices 110. The Logical Link Control and Adaptation Protocol (L2CAP) provides data services to the upper layer protocols permitting them to transmit and receive data packets up to 64 kilobytes in length. The Service Discovery Protocol (SDP) enables a Bluetooth device 110 to discover available supporting services to enable it to connect to other Bluetooth device(s) 120. RFCOMM is an RS 232 serial emulation protocol that provides transport capabilities for upper level services that emulate a serial line as the transport mechanism. Other Bluetooth standard protocols can be included to support the applications of file transfer, Internet bridge, LAN access, information synchronization, multiple service provider telephony, and wireless headset functions. The Bluetooth protocol drivers 208' in device 200 have similar features to those of the protocol driver 208.

Transport driver 210 in user device 110 includes the host controller firmware and a standardized interface to the RF wireless module 212. An example of a standardized interface is the RS232 serial device interface, enabling the exchange of control and data between the protocol driver 208 and the RF wireless module 212. Other standard interfaces for the Bluetooth transport driver 210 include the Universal Serial Bus (USB) and Universal Asynchronous Receiver-Transmitter (UART) protocols. The transport drivers 210' in device(s) 120 have similar features to those of the transport driver 210.

In a shopping scenario, a store merchant possesses a Bluetooth-enabled fixed position device 200 which the merchant uses to communicate with the user. The merchant's Bluetooth-enabled fixed position device 200 includes application programs 206', protocol driver 208', transport driver 210', and RF wireless module 212'.

Fixed position device(s) 200 and service operator 130 are connected by means of wide area network (WAN) interfaces 216 and 236, respectively, to a wide area network 220. Profile operator 115 is connected by means of TCP/IP interface 246 to Internet 224 which, in turn, is connected to wide area network (WAN) 220 across a protocol gateway 222.

Figure 3A:
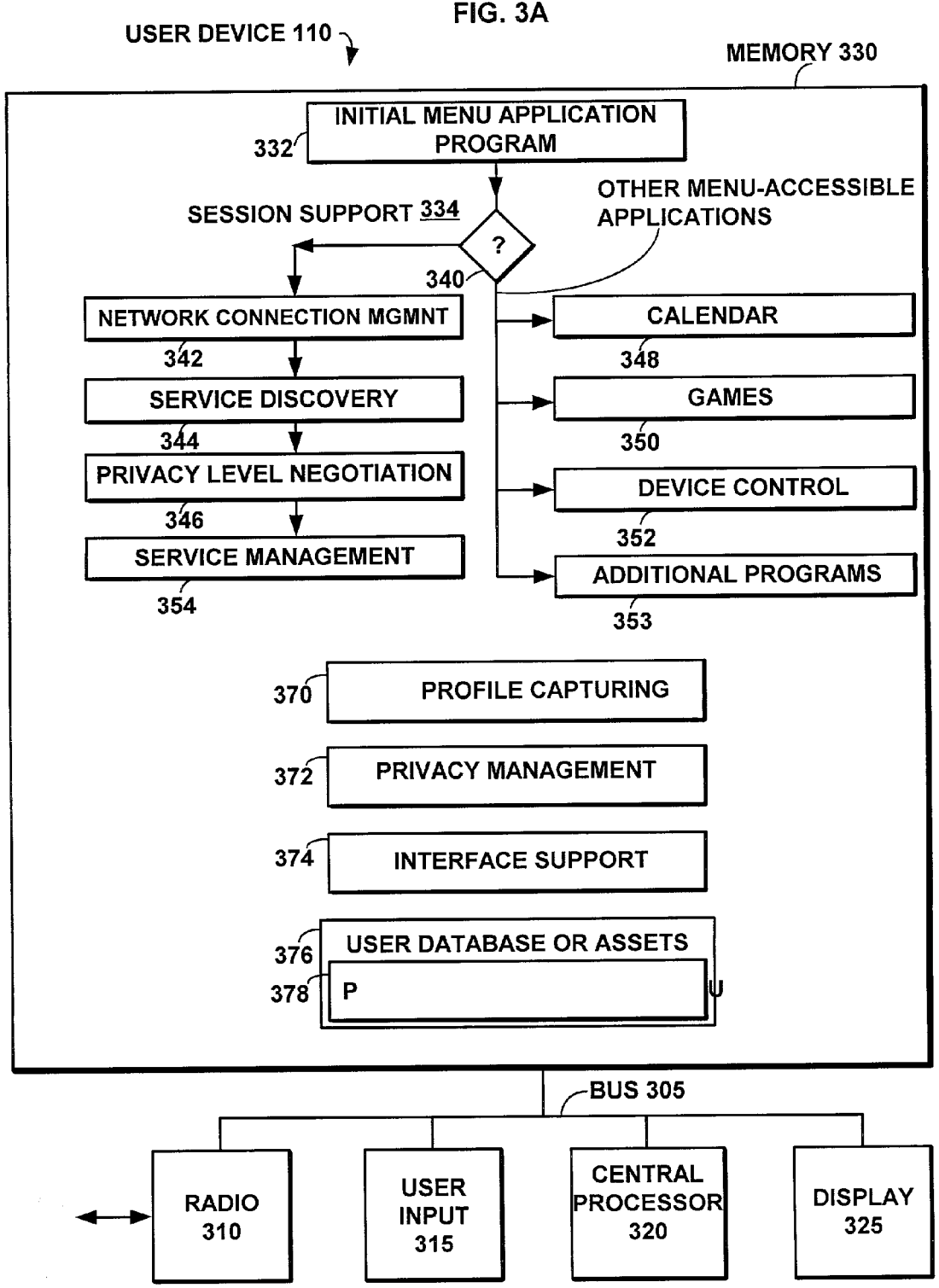
FIG. 3A is an exemplary block diagram of the wireless user device of FIG. 2.

FIG. 3A is an exemplary block diagram of a user device 110 of FIG. 2. As shown, user device 110 may include a radio transmitter 310, a user input 315, a central processor 320, a display 325 and a memory 330, which are connected across a bus 305. User device 110 may also include an interface for communicating across a line-based network.

Memory 330 stores an initial menu application program 332 for providing a menu of options to the user for selection and implementation of other application programs or routines according to the user selection. For example, menu application program 332 may initiate a session support application program 334 for supporting a session between the user and one or more other parties.

Session support application program 334 may include a network connection management routine 342, service discovery routine 344, privacy level negotiation routine 346 and a service management routine 354. Network connection management routine 342 is a process by which the user can be connected to Cellular Networks and Personal Area Networks (PAN) independently and by which the Bluetooth master and slave relationship can be determined. Service discovery routine 344 is a process which enables the user to activate or deactivate visibility to Bluetooth Access points (such as fixed position wireless devices) or enables the terminal to discover Bluetooth nodes in a PAN. Privacy level negotiation routine 346 is a process by which the user or the terminal on behalf of the user can determine which level of privacy should be maintained in an ad-hoc or user-initiated service context. As discussed above, the different levels of privacy may include Anonymous, Pseudonymous, Anonymous transaction and Authenticated. Service management routine 354 is a process by which the same service session can be maintained over several different network connections.

Initial menu application program 332 may also provide access to other menu accessible application programs, such as a calendar 348, games 350, device control 352 or other additional applications 353.

A user database or assets 376 is also maintained to store the user's private assets as well as other information. These assets may include, for example, profile preferences, rights wallet, presence information (e.g., context, device, location), and Personal Information Manager (PIM). Profile preferences involves a process for saving, storing and retrieving profile and preferences of a certain user, e.g., age, gender, social security number, shoe size, favorite food, loyalty card numbers, credit card numbers, etc. Rights wallet involves a process for saving, storing and retrieving rights belonging or given to a certain user, e.g., voting rights, access rights, etc., and the parameters to these, e.g., time, location, context, etc. Presence involves a process for saving, storing and retrieving context, device and location data of a given user. PIM involves a process for saving, storing and retrieving Personal Information data of a given user, e.g., calendar, e-mail, etc.

As part of the information maintained in assets 376, there may include personal assets which are unique to the user and/or user device and may be employed in the personalization of services to the user. The value of personal assets is extremely high for target marketing, customer relationship management and product or service personalization. As such, there is a substantial interest by other parties to obtain such assets.

Some examples of personal assets will be discussed immediately below. These personal assets may overlap with assets or data already discussed above as maintained in assets 376. For example, personal assets may include:

(1) Preferences (dynamic data) such as attitudes, interests, likes, dislikes (per context, service, area), wants, intents, wishes, dreams, desires, moods, etc.;

(2) Profile such as demographics, presence, location, context, religion, age, gender, race, etc.;

(3) Characteristics such as behavioral habits, use customs and so forth;

(4) Right Wallet such as bought rights, applied rights, etc.;

(5) Body information such as blood pressure, blood counts, body temperature, heart rate, etc.;

(6) Electronic Cash ("E-Cash")/Electronic Coin ("E-Coin"); and (7) User identification data such as a name, contact information, social security number, etc.

Memory 330 may further include additional application programs to facilitate the management of user privacy in communications with other parties. These programs may include a profile capturing program 370, a privacy management program 372, and an interface support program 374. These programs will be discussed with reference to FIG. 3C which illustrates a high level architecture of components of the network system 100 in which various application or function layers and sub-layers supported by the user device are shown.

Figure 3B:
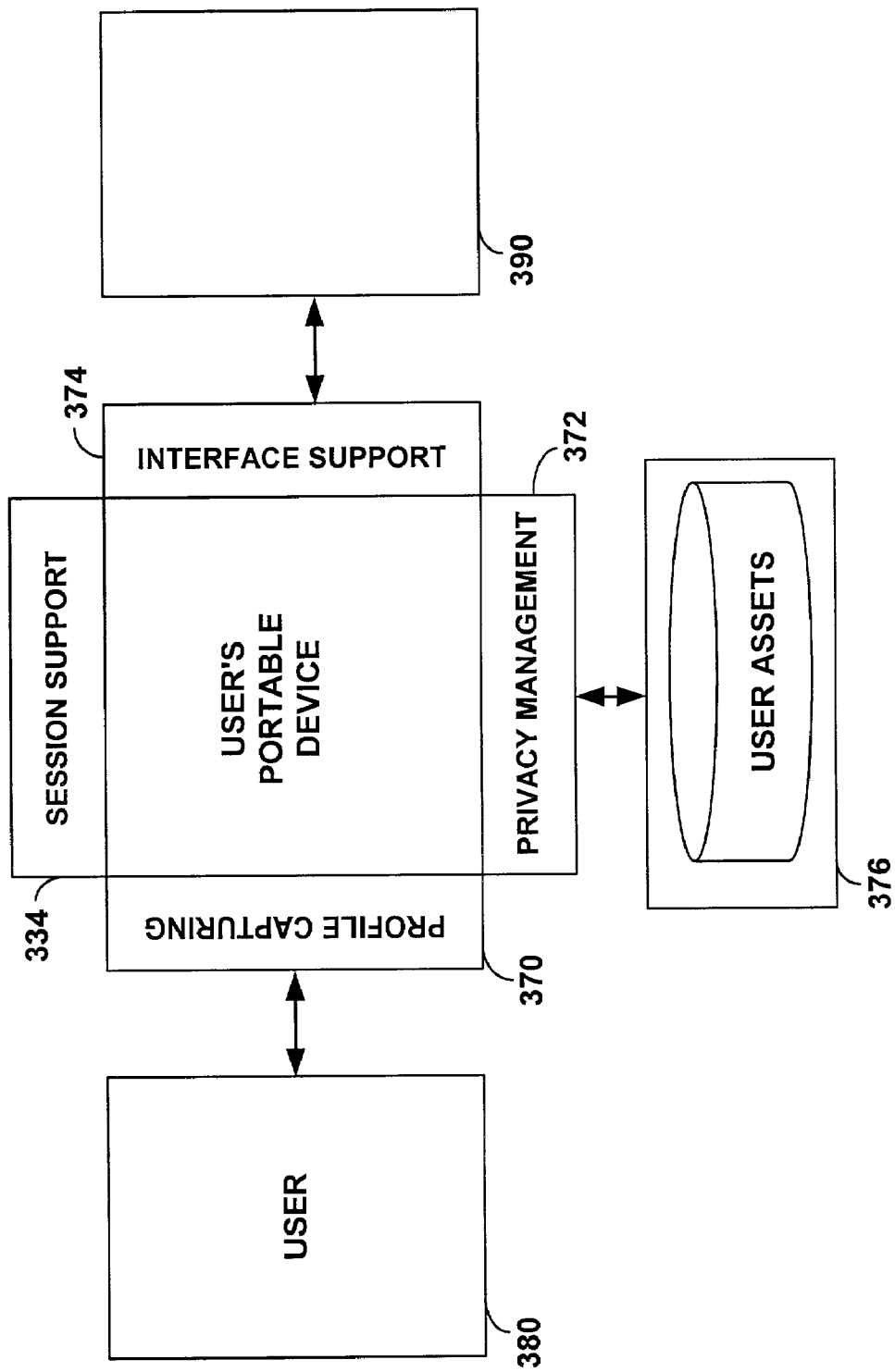
FIGS. 3B and 3C illustrate an exemplary high level architecture of components of the network system of FIG. 1A in which various application or function layers and sub-layers supported by the user device are shown.
Figure 3C:
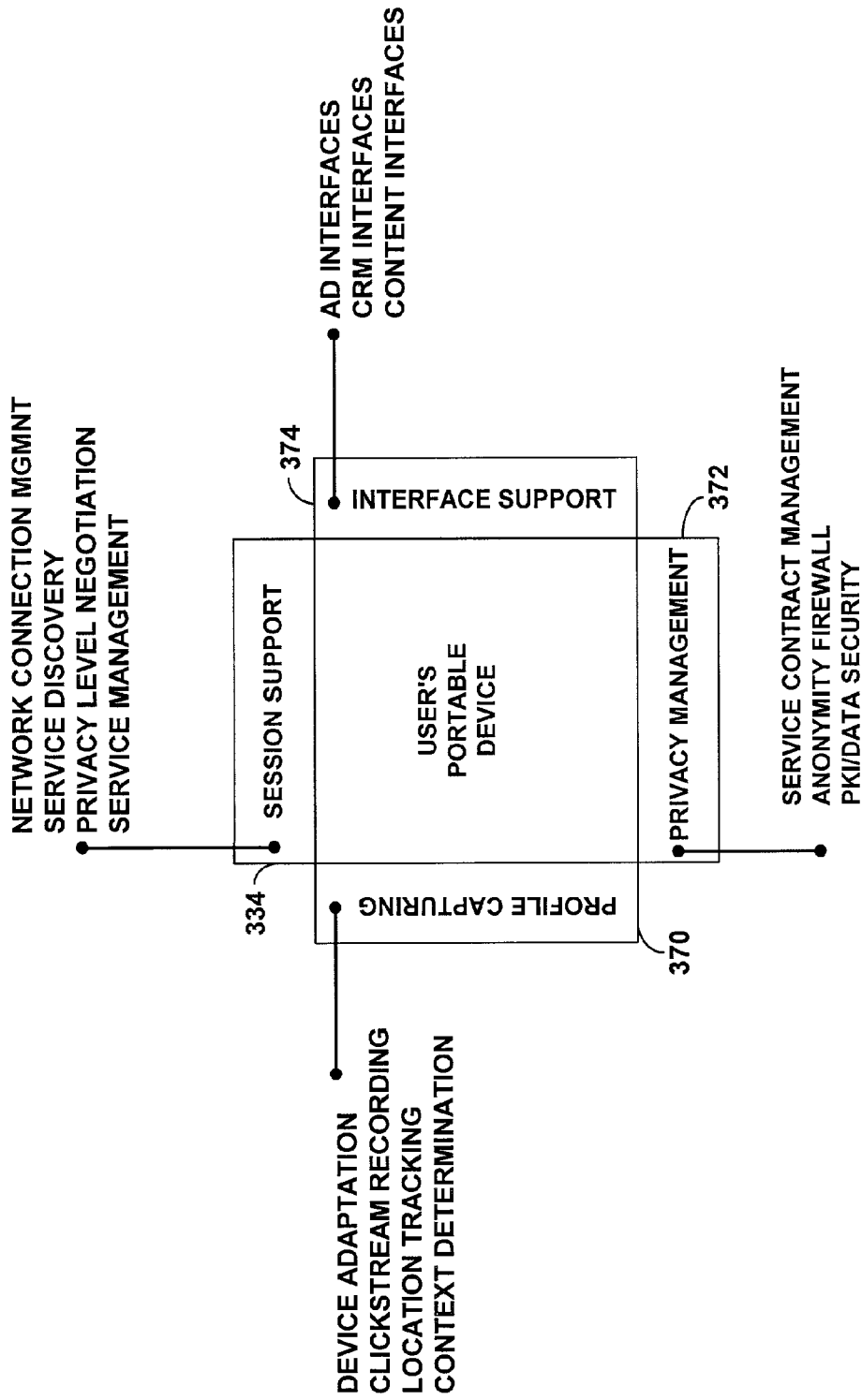

As shown in FIG. 3C, profile capturing application program 370 provides a mechanism for capturing profile related information of the user. Profile capturing application program 370 may include various routines, such as device adaptation, clickstream recording, location tracking and context determination. Device adaptation is a process by which the content elements adapt to the user interface and presentation available in the terminal. The adaptation takes into account screen resolution, colors, free memory size and bandwidth available.

Clickstream recording is used for calibrating the middleware layer, i.e., for providing data to a recommendation engine or for optimizing menu structures. The end user should at any time be able to opt-out from recording or to review the data recorded from the clickstream.

Location tracking is used for calibrating the middleware layer, i.e., for providing data to a recommendation engine or for optimizing menu structures. The end user should at any time be able to opt-out from tracking or to review location data saved during consumption.

Context determination is used for calibrating the middleware layer, i.e., for providing data to a recommendation engine or for optimizing menu structures. Context determination parameters may be, for instance, time, content available at the given time and environment, altitude, heart beat rate, etc. The end user should at any time be able to opt-out from context determination or to review context data saved during interactive activities.

Furthermore, content adaptation within profile capturing is the mechanism for determining the mark-up language to be used, preferably, but not limited to, WML or XML.

As shown in FIG. 3B, profile capturing application program 370 interacts with user 380 to capture profile-related information. Privacy management application program 372 provides a security layer to access of a user assets 376, and interface support application program 374 enables user device 110 to interact with a service operator to obtain services provided through the service operator's content and applications 390.

The Service operator's content and applications 390 may include advertising platforms, content aggregation, CRM-Call Center Applications, one-to-one marketing, chat rooms, network games, and multimedia messaging. Advertising platforms may include Internet and mobile Internet advertising platforms. Content aggregation may involve a process of combining content from many sources into one service. CRM-Call Center Applications may involve a process for managing short term and context sensitive customer relationship data and retrieving it from CRM applications for calibrating middleware services. One-to-one marketing may involve service content profiling mechanisms using privacy levels. Chat rooms provide real-time person to person communication services using privacy levels. Network game includes real-time network gaming using privacy levels. Finally, multimedia messaging involves messaging with multimedia elements using privacy elements.

Privacy management application program 372 for managing security over the user's assets. Application program 372 may include various functions, such as service contract management, Anonymity, Public Key Infrastructure (PKI) and authentication. Service contract management involves a process for determining the wishes of the consumer to lower the privacy levels and reveal certain viewpoints to the consumer assets in a certain service session. Anonymity is preferably the default level of privacy in the privacy management. The Public Key Infrastructure (PKI) is the method by which security is added to the privacy management. PKI may provide for encryption and decryption as well as authentication of interacting parties through digital certificates, such as privacy enforcement certificates (PEC) as discussed herein.

Interface support application program 374 provides support for interacting with another party, such as a service operator. Interface support application program 374 may include various sub-functions, such as ad interfaces, Ubiquitous Customer Relations Management (UbiCRM) and content interfaces. Ad interfaces may include context, privacy, device and location sensitive Advertising platform interface mechanisms. CRM may include context, privacy, device and location sensitive CRM interface mechanisms. Content interfaces context, privacy, device and location sensitive content interface mechanisms.

Figure 4:
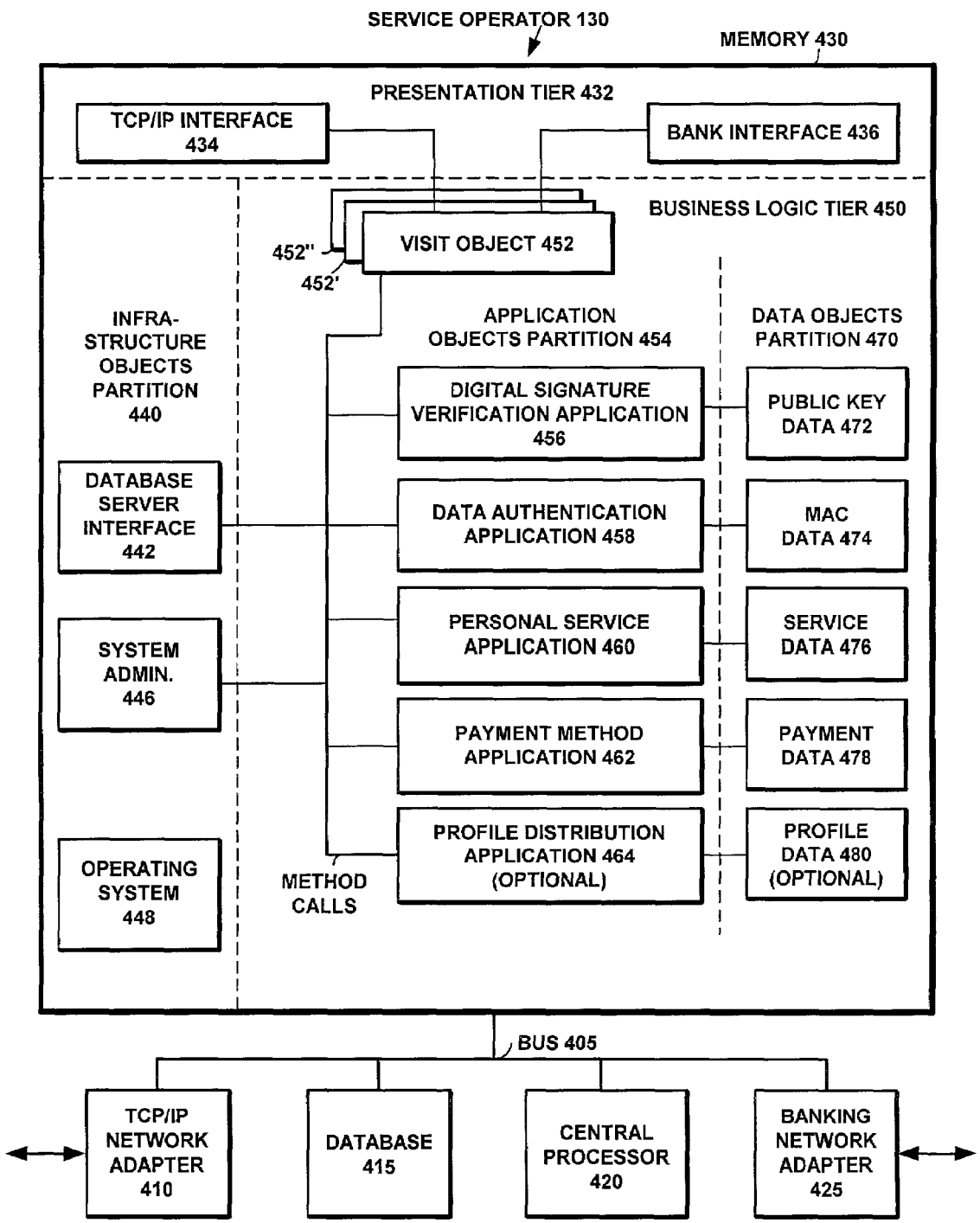
FIG. 4 is an exemplary block diagram of a service operator.

FIG. 4 shows the functional components of an exemplary service operator 130 arranged as an object model. The object model groups the object oriented software programs into components that perform the major functions and applications in service operator 130. The object model for memory 430 of service operator 130 employs a three-tier architecture that includes presentation tier 432, infrastructure objects partition 440, and business logic tier 450. The object model further divides business logic tier 450 into two partitions, application objects partition 454 and data objects partition 470.

Presentation tier 432 retains the programs that manage the device interfaces to service operator 130. In FIG. 4, presentation tier 432 includes network interface 434, and bank interface 436. A suitable implementation of presentation tier 432 may use Java servlets to interact with user device via the hypertext transfer protocol ("HTTP"). The Java servlets run within a request/response server that manages the exchange of messages between a user device and service operator 130. A Java servlet is a Java program that runs within a Web server environment. A Java servlet takes a request as input, parses the data, performs logic operations, and issues a response back to a user device. The Java runtime platform pools the Java servlets to simultaneously service many requests. Network interface 434 accepts request messages from a user device and passes the information in the request to visit object 452 for further processing. Visit object 452 passes result of that processing to network interface 434 for transmission back to the user device. Network interface 434 may also use network adapter 410 to exchange data with another user device. Bank interface 436 manages the exchange of messages between a financial institution and visit object 452 in a similar manner to network interface 434.

Infrastructure objects partition 440 retains the programs that perform administrative and system functions on behalf of business logic tier 450. Infrastructure objects partition 440 includes operating system 448, and an object oriented software program component for database server interface 442, and system administrator interface 446.

Business logic tier 450 in FIG. 4 includes multiple instances of visit object 452. A separate instance of visit object 452 exists for each bank interface 436 or network interface 434 session. Each visit object 452 is a stateful session bean that includes a persistent storage area from initiation through termination of the session, not just during a single interaction or method call. The persistent storage area retains information associated with the session.

When a user device sends a message to service operator 130, a message is sent to network interface 434 to invoke a method that creates visit object 452 and stores connection information in visit object state 452. Visit object 452 may, in turn, invoke a method in digital signature verification application 456 to verify the source that generated the message.

Digital signature verification application 456 extracts the digital signature from the message and uses public key data 472 to decode the signature and verify the identity of the source that generated the message. Even though FIG. 4 depicts central processor 420 as controlling digital signature verification application 456, it is to be understood that the function performed by digital signature verification application 456 can be distributed to a separate system configured similarly to service operator 130.

When a user device sends a message to service operator 130, a message is sent to network interface 434 to invoke a method that creates visit object 452 and stores connection information in visit object state 452. Visit object 452 may, in turn, invoke a method in data authentication application 458 to authenticate a user device that generated the message. Data authentication application 458 uses MAC data 474 to authenticate the identity of the user device that generated the message. Even though FIG. 4 depicts central processor 420 as controlling data authentication application 458, it is to be understood that the function performed by data authentication application 458 can be distributed to a separate system configured similarly to service operator 130.

Figure 8A:
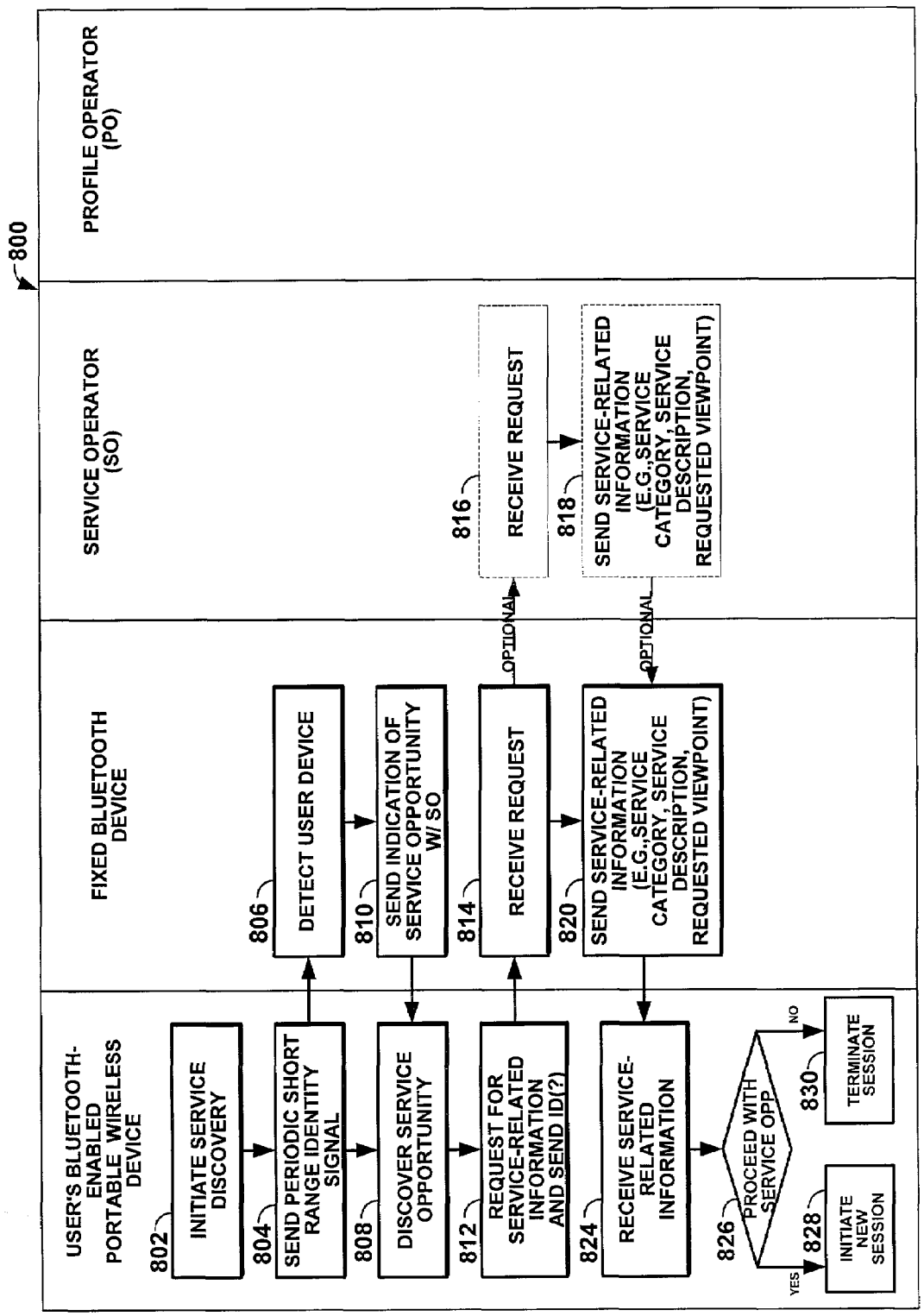
FIGS. 8A through 8D illustrate an exemplary process by which a user device controls a privacy level of communications with a service operator and controls access and usage of the user's profile information by the service operator in accordance with an advantageous embodiment.
Figure 8B:
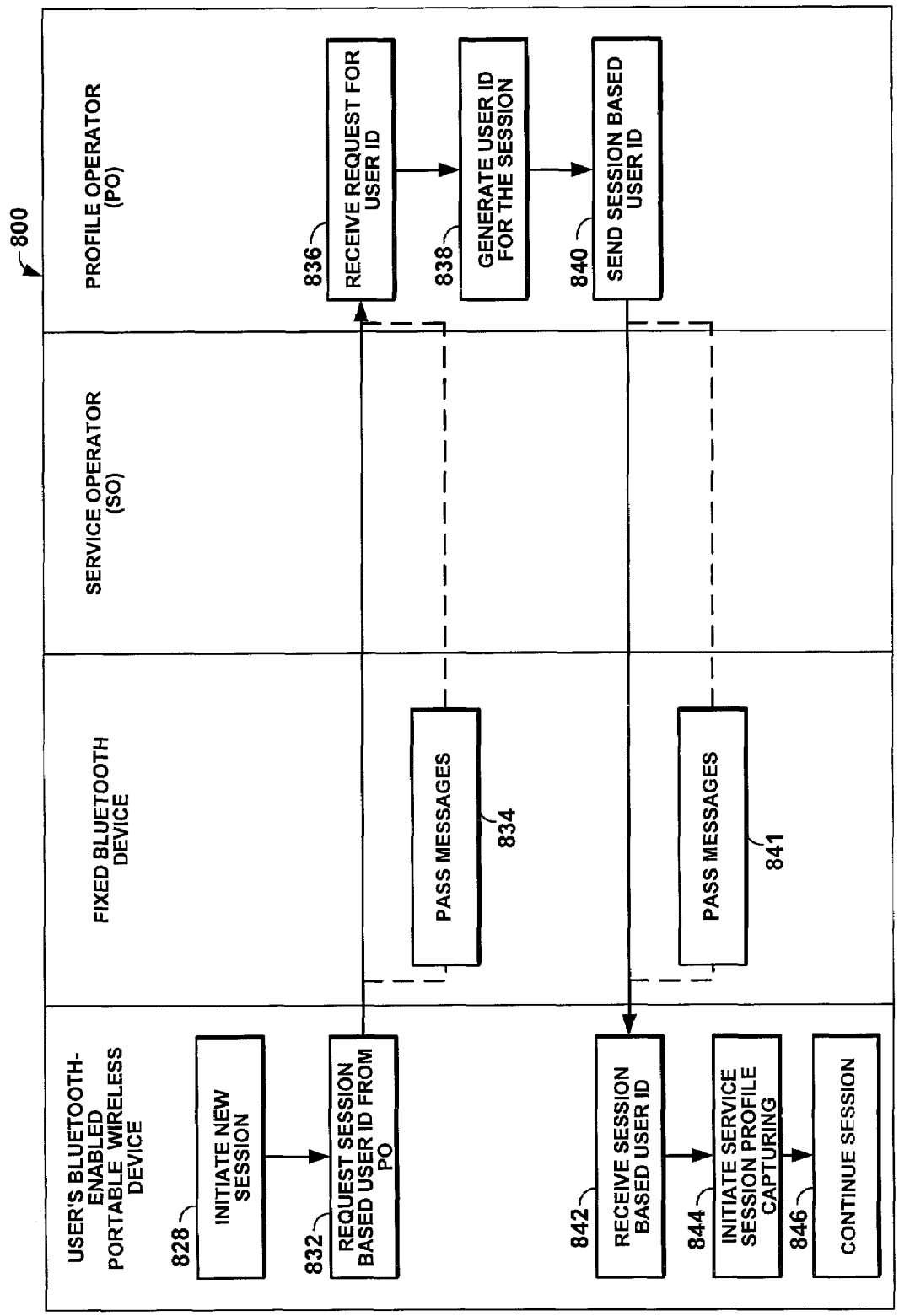
Figure 8C:
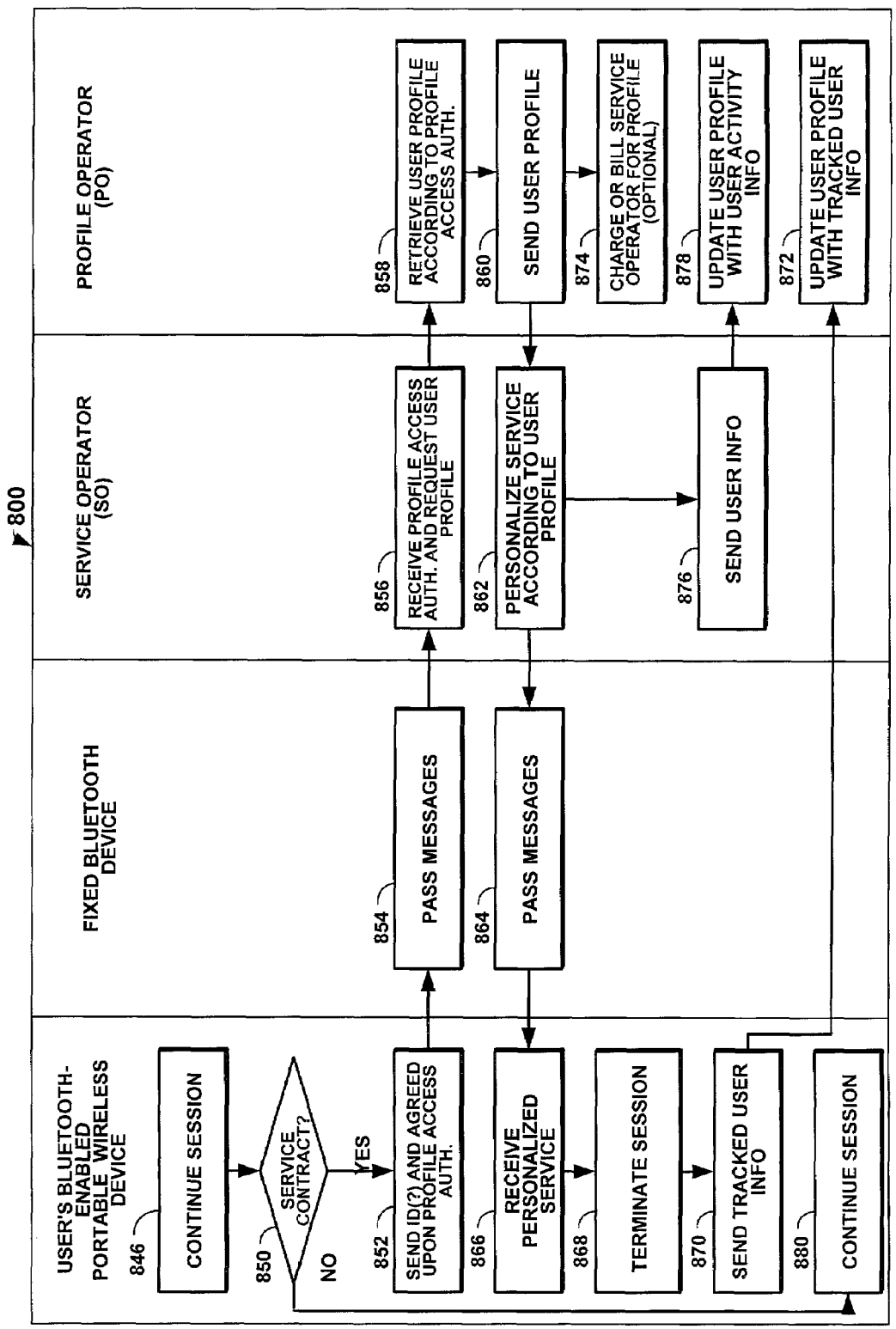
Figure 8D:
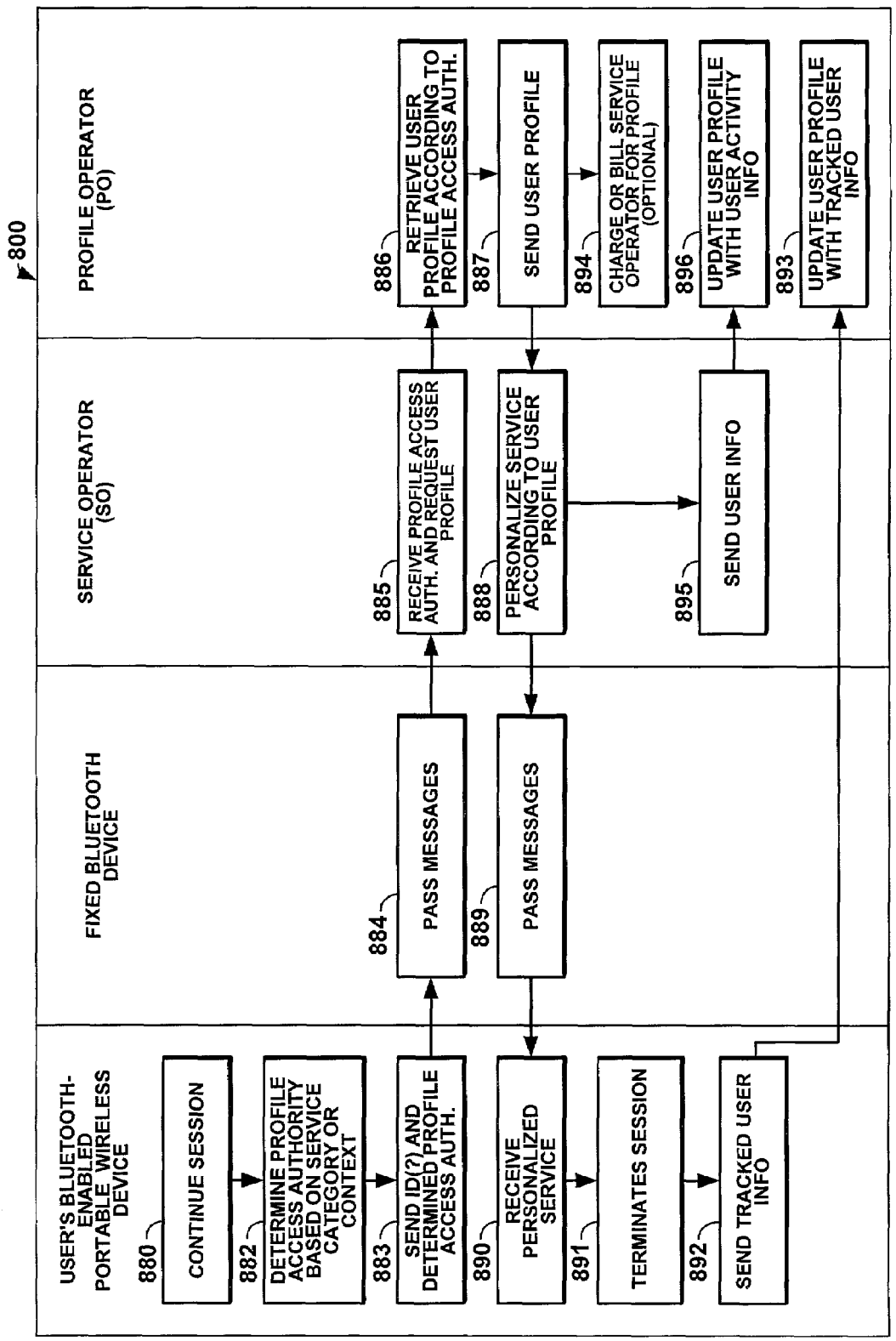

When a user device sends a message to service operator 130, a message is sent to network interface 434 to invoke a method that creates visit object 452 and stores connection information in visit object state 452. Visit object 452 may, in turn, invoke a method in personal service application 460 to perform the service-related operations including service negotiations, user profile access, the provision of services including personalized services. Personal service application 460 uses service data 476 to perform such operation. FIGS. 8A through 8C as well as the discussion above with reference to FIGS. 3B and 3C on the service operator's content and application 390 describe the service-related functions of personal service application 460. Even though FIG. 4 depicts central processor 420 as controlling personal service application 460, it is to be understood that the function performed by personal service application 460 can be distributed to a separate system configured similarly to service operator 130.

When a user device sends a message to service operator 130, a message is sent to network interface 434 to invoke a method that creates visit object 452 and stores connection information in visit object state 452. Visit object 452 may, in turn, invoke a method in payment method application 462 to compute a payment or fee for services rendered through use of payment data 478. Even though FIG. 4 depicts central processor 420 as controlling payment method application 462, it is to be understood that the function performed by payment method application 462 can be distributed to a separate system configured similarly to service operator 130.

When a user device sends a message to service operator 130, a message is sent to network interface 434 to invoke a method that creates visit object 452 and stores connection information in visit object state 452. Visit object 452 may, in turn, invoke a method in profile distribution application 464 to control distribution/access of a user's profile information to lower level service operators through use of profile data 480. An example of a service operator which would implement profile distribution application is $SO_3+PO_3$ of FIG. 6B. Even though FIG. 4 depicts central processor 420 as controlling profile distribution application 464, it is to be understood that the function performed by profile distribution application 464 can be distributed to a separate system configured similarly to service operator 130.

Figure 5:
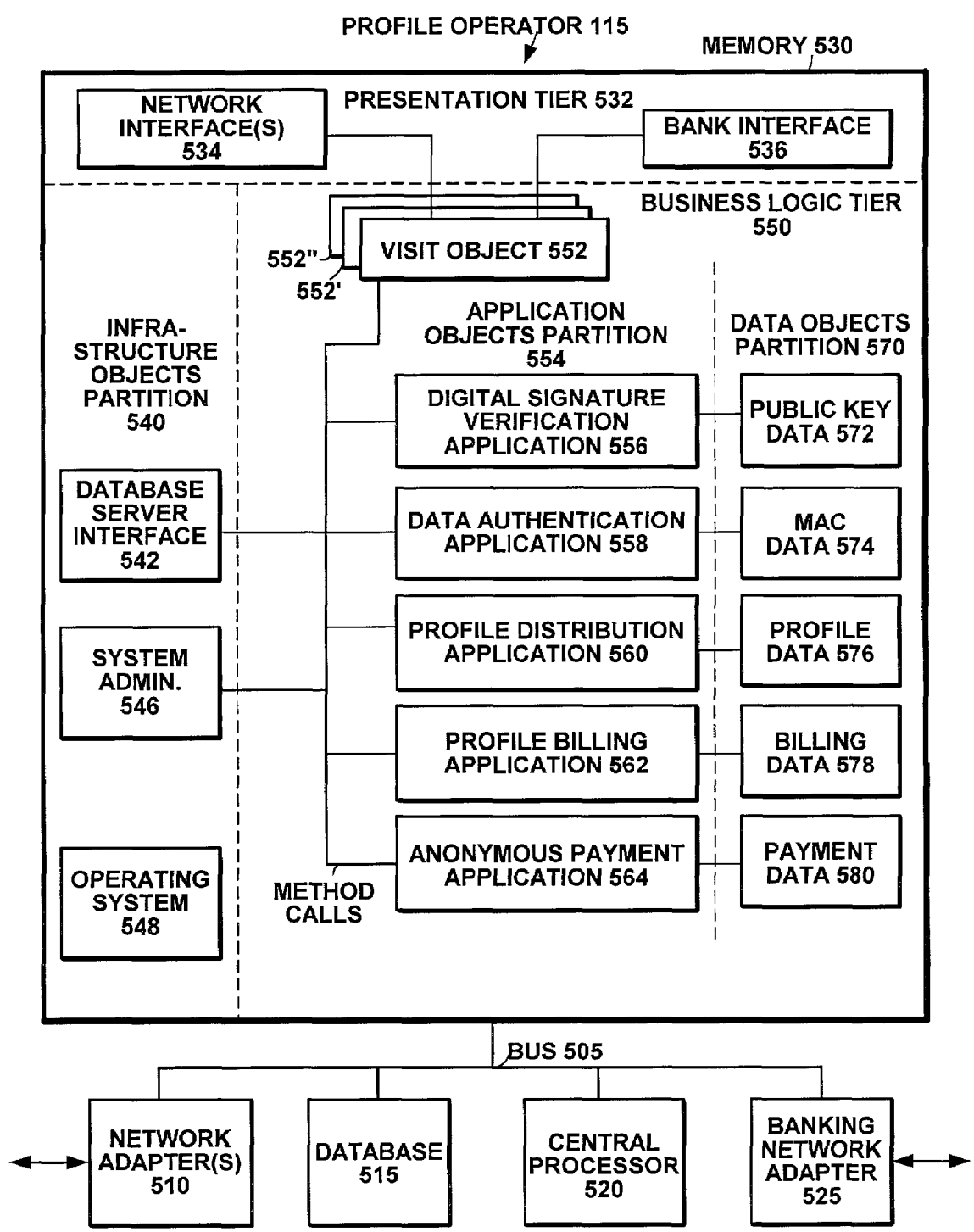
FIG. 5 is an exemplary block diagram of a profile operator.

FIG. 5 shows the functional components of profile operator 115 arranged as an object model. The object model groups the object oriented software programs into components that perform the major functions and applications in profile operator 115. The object model for memory 530 of profile operator 115 employs a three-tier architecture that includes presentation tier 532, infrastructure objects partition 540, and business logic tier 550. The object model further divides business logic tier 550 into two partitions, application objects partition 554 and data objects partition 570.

Presentation tier 532 retains the programs that manage the device interfaces to profile operator 115. In FIG. 5, presentation tier 532 includes network interface 534, and bank interface 536. A suitable implementation of presentation tier 532 may use Java servlets to interact with user device via the hypertext transfer protocol ("HTTP"). The Java servlets run within a request/response server that manages the exchange of messages between a user device and profile operator 115. A Java servlet is a Java program that runs within a Web server environment. A Java servlet takes a request as input, parses the data, performs logic operations, and issues a response back to a user device. The Java runtime platform pools the Java servlets to simultaneously service many requests. Network interface 534 accepts request messages from a user device and passes the information in the request to visit object 552 for further processing. Visit object 552 passes result of that processing to network interface 534 for transmission back to the user device. Network interface 534 may also use network adapter 510 to exchange data with another user device. Bank interface 536 manages the exchange of messages between a financial institution and visit object 552 in a similar manner to network interface 534.

Infrastructure objects partition 540 retains the programs that perform administrative and system functions on behalf of business logic tier 550. Infrastructure objects partition 540 includes operating system 548, and an object oriented software program component for database server interface 542, and system administrator interface 546.

Business logic tier 550 in FIG. 5 includes multiple instances of visit object 552. A separate instance of visit object 552 exists for each bank interface 536 or network interface 534 session. Each visit object 552 is a stateful session bean that includes a persistent storage area from initiation through termination of the session, not just during a single interaction or method call. The persistent storage area retains information associated with the session.

When a user device sends a message to profile operator 115, a message is sent to network interface 534 to invoke a method that creates visit object 552 and stores connection information in visit object state 552. Visit object 552 may, in turn, invoke a method in digital signature verification application 556 to verify the source that generated the message. Digital signature verification application 556 extracts the digital signature from the message and uses public key data 572 to decode the signature and verify the identity of the source that generated the message. Even though FIG. 5 depicts central processor 520 as controlling digital signature verification application 556, it is to be understood that the function performed by digital signature verification application 556 can be distributed to a separate system configured similarly to profile operator 115.

When a user device sends a message to profile operator 115, a message is sent to network interface 534 to invoke a method that creates visit object 552 and stores connection information in visit object state 552. Visit object 552 may, in turn, invoke a method in data authentication application 558 to authenticate a user device that generated the message. Data authentication application 558 uses MAC data 574 to authenticate the identity of the user device that generated the message. Even though FIG. 5 depicts central processor 520 as controlling data authentication application 558, it is to be understood that the function performed by data authentication application 558 can be distributed to a separate system configured similarly to profile operator 115.

When a user device sends a message to profile operator 115, a message is sent to network interface 534 to invoke a method that creates visit object 552 and stores connection information in visit object state 552. Visit object 552 may, in turn, invoke a method in profile distribution application 560 to control distribution/access of a user's profile information to lower level service operators through use of profile data 576. FIGS. 8A through 8D describes, in greater detail, the process of profile distribution application 560. Even though FIG. 5 depicts central processor 520 as controlling profile distribution application 560, it is to be understood that the function performed by profile distribution application 560 can be distributed to a separate system configured similarly to profile operator 115.

When a user device sends a message to profile operator 115, a message is sent to network interface 534 to invoke a method that creates visit object 552 and stores connection information in visit object state 552. Visit object 552 may, in turn, invoke a method in profile billing application 562 to bill another party for services rendered (e.g., charge service operator for profile information) through use of billing data 578. Even though FIG. 5 depicts central processor 520 as controlling profile billing application 562, it is to be understood that the function performed by profile billing application 562 can be distributed to a separate system configured similarly to profile operator 115.

When a user device sends a message to profile operator 115, a message is sent to network interface 534 to invoke a method that creates visit object 552 and stores connection information in visit object state 552. Visit object 552 may, in turn, invoke a method in anonymous payment application 564 to provide trusted anonymous third payment services for a user through use of payment data 580. Even though FIG. 5 depicts central processor 520 as controlling anonymous payment application 564 it is to be understood that the function performed by anonymous payment application 564 can be distributed to a separate system configured similarly to profile operator 115.

It will be readily appreciated that service operator 130 and/or profile operator 115 may alternatively, or in addition to, the communication software discussed above, be equipped with a WML Script and WML functionality for communicating with the various system components (e.g., the user device, service operator, and/or profile operator).

Figure 6A:
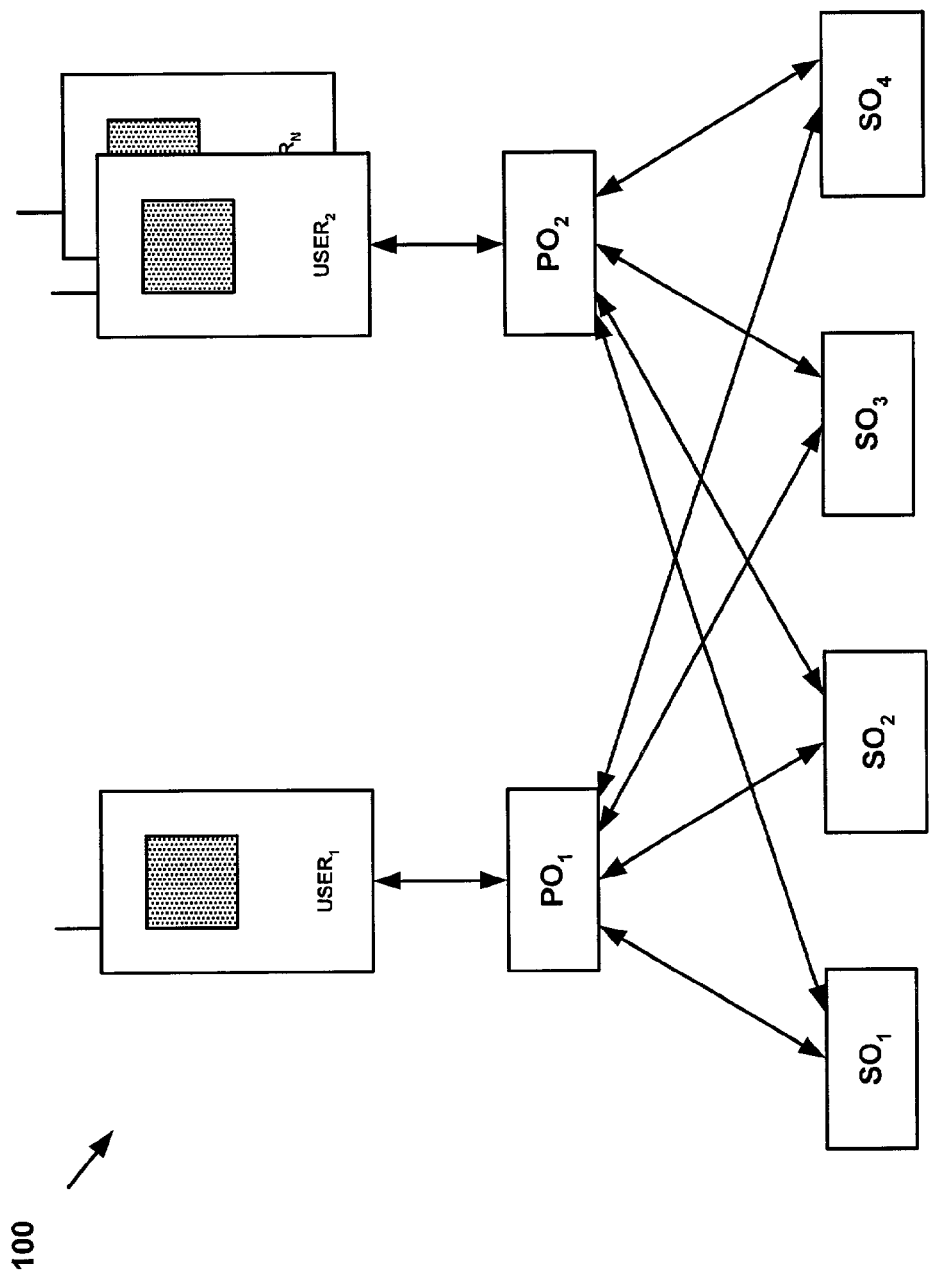
FIG. 6A is an overview of one example of an operator arrangement.

FIG. 6A is an overview of one example of a service operator arrangement in which the user actions, via wireless portable device 110, are transmitted to service operators using a profile operator. As shown, each profile operator, e.g., $PO_1$ and $PO_2$, serves all the service operators $SO_1$ through $SO_4$ that the user may wish to use. To selectively control access and usage of profile information, viewpoint technology may be employed to enable different parts of the user profile to be accessed and used by different service operators. Viewpoints allow the service operator to access subsets of profile information for different purposes in different contexts.

In certain situations, a user or profile operator may wish to mask the user's identity from the service operators. Profile operators can be configured to perform such identity masking in at least two different levels. The one level of masking is pseudonymity which allows service operators to establish a relationship with the users while offering an opportunity to actively conceal or reveal elements of user identity. Another level of masking is complete anonymity which does not allow the service operators to identify the users. In both levels of identity masking, the profile operators can handle the billing of services.

From the profiling point of view, a significant difference between the two levels of identity masking is that pseudonymity allows each service operator to build its own profiles of user behavior since the service usage behavior of each individual user employing a service can be identified. However, anonymity does not allow service operators to build user profiles since the service operator cannot combine the usage data from multiple sessions for a particular user.

In order to receive profile information from a profile operator the service operators may be required to provide the profile operator with profile update information based on the user's service usage behavior. If the users are using the services anonymously, the service operators cannot build their own user profiles and the update information is the only way to develop the quality of profiles. Since the update information is valuable for the profile operators the service operators can be compensated by decreasing the price of the profile information in exchange for updates.

Figure 6B:
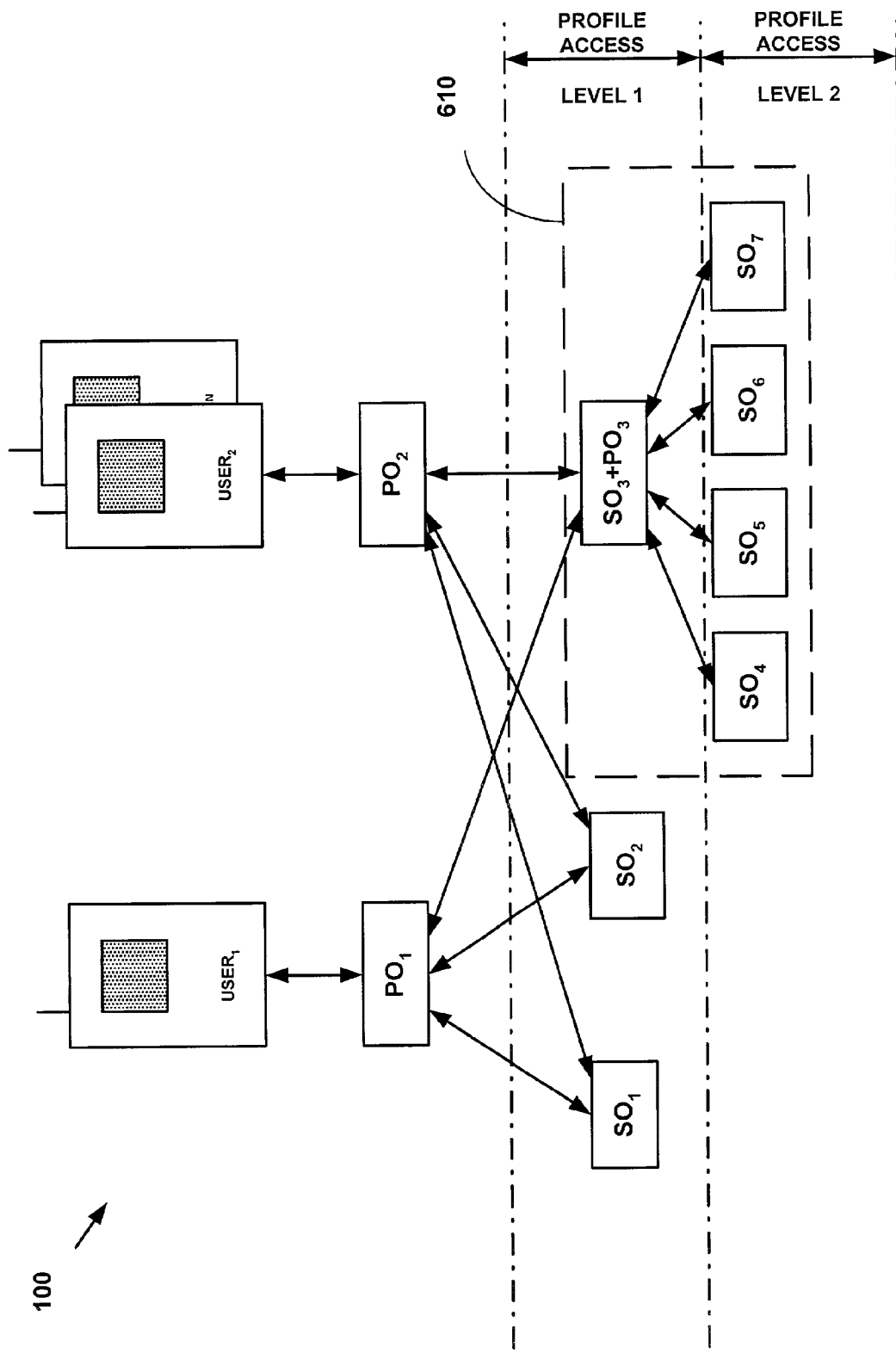
FIG. 6B is an overview of another example of an operator arrangement in which service operators may be hierarchically arranged to provide additional profile access levels or profile filtering.

FIG. 6B is an overview of another example in which service operators may be hierarchically arranged to provide additional privacy levels or filtering in accordance with a further embodiment. As shown, service operators can be arranged hierarchically ($SO_4$-$SO_7$) such that higher level operators serve lower level operators. For example, with reference to 610, the service operator $SO_3$ serves the lower level service operators $SO_4$ through $SO_7$. In this kind of arrangement, the service operator $SO_3$ may also incorporate a profile operator $PO_3$ or its functions to provide profiling services for lower level service operators $SO_4$ through $SO_7$.

In this hierarchical arrangement, the level of identification information revealed to the lower level service operator may vary as well as the level of detail in the update information provided to the upper level operator. For example, the service operator $SO_3$ may be privy to a higher profile access level than the lower level service operators $SO_4$ through $SO_7$ since the service operator $SO_3$ may further filter a user's profile information provided to these lower level service operators. At the same time, the service operator $SO_3$ may receive user information from the lower level service operators $SO_4$ through $SO_7$ to update the user's profile.

The operator arrangements as shown in FIGS. 6A and 6B provide some potential advantages and disadvantages to the parties involved. For example, the advantages of these operator arrangements may, for example, include:
    support for anonymity,
    personalization over multiple service operators,
    some service access information is available to profile operators without explicit feedback from the service operators,
    personalization operator has access to usage data of all its customers,
    a user can select his profile operator,
    $SO_3$/$PO_3$ can analyze all visitors to a collection of $SO_8$ ($SO_6$-$SO_7$), which enables personalization at least across services with more complete data, and
    hierarchical service operator arrangement supports affiliate companies.

Some potential disadvantages of such operator arrangements may, for example, include:
    service operators have poorer data for personalization, and a profile operator does not see all the users accessing a certain service operator.

FIG. 7A illustrates an exemplary profile database 576 maintained or employed by profile operator 115. Profile database may include a service contract field 705, a category field 710, a viewpoint identifier (ID) field 715 and a profile items field 720. While the various fields and information are self-explanatory, a brief discussion of the database is provided below.

Service contract field 705 maintains an identity of those parties with pre-existing agreements with the user. These parties may have agreed upon the user profile subset to be provided to them. Category field 710 maintains information on the various categories of service contexts or categories a user may encounter. For example, a category may include shopping, meeting, emergency, doctor visit and music bar.

Viewpoint ID 715 maintains a viewpoint identifier for specifying a particular subset or viewpoint of a user's profile information.

Profile items 720 define various defined subsets or viewpoints of the user's profile information. These profile items are addressable by profile operator 115 according to a service contract, category or viewpoint ID. For example, in a shopping example, user device 110 may forward the category information (e.g., shopping) or a viewpoint ID (e.g., 1111) to service operator 130 which is then provided as part of a request to profile operator 115 for the user's profile information. Based on either the category or viewpoint identifier, profile operator 115 would provide the appropriate subset of profile information, e.g., the user's shopping list, the user's likes and/or dislikes and the user's usual buying habits.

FIG. 7A simply shows examples of various categories/contexts (e.g., shopping, meeting, emergency, doctor visit, music bar/friends, etc.), viewpoints and asset subsets. Other categories/contexts, viewpoints and asset subsets may be defined as desired. Furthermore, such information may be maintained or employed by the user device.

FIG. 7B illustrates an exemplary profile access authority database 360 maintained or employed by user device 110 to determine a profile access authority or level. Database 360 may include a service contract field 725, a category field 735 and a viewpoint ID field 735, which maintain similar information as in fields 705, 170 and 715, respectively, as discussed above in FIG. 7A. The database 360 is used to determine a viewpoint or subset of profile information to be available to service operator 130 based whether the service operator has a contract with the user or based on the service category.

It should be understood that the database structures and fields/labels shown in FIGS. 7A and 7B are merely one example of how information may be maintained, and that data may be maintained in any manner, as desired, such as in an object-oriented database or other database formats, with different fields/labels, etc.

FIGS. 8A through 8D illustrate an exemplary process 800 by which a user controls a privacy level of communications with a service operator and controls access and usage of the user's profile information by the service operator via the user's Bluetooth-enabled portable device. The process 800 will be discussed with reference to FIGS. 1 and 2. In this example user device 110 is a Bluetooth-enabled portable wireless device and fixed position Bluetooth wireless device corresponds, e.g., to device 200 of FIG. 2. For the purposes of brevity, the fixed position Bluetooth wireless device will be referred hereafter as fixed position device 200. Fixed position device 200 enables location-based services as well as other services to be provided to the user. Communications between user device 110, service operator 130 and profile operator 115 may be facilitated through fixed position device 200 or other communications means, such as by cellular.

The process 800 commences at step 802 where user device 110 initiates service discovery automatically or upon a user request. At step 804, user device 110 sends periodic short range identity signal. At step 806, fixed position device 200 detects a user device 110's presence and, at step 810, sends an indication of service opportunit(ies) available from service operator 130. User device 110 discovers these opportunities at step 808, and sends a request for service-related information at step 812. Along with the request, user device 110 may or may not send an identifier depending upon the privacy level determined by the user device. Where user device 110 is simply discovering available service opportunities, the user device would unlikely send any identifier. In other words, the request for service information would be an anonymous request.

Fixed position device 200 receives the request at step 814 and, at step 820, sends the service-related information to user device 110. The service-related information may include service category, service description, requested viewpoint or any information which enables user device 110 to make a determination as to a privacy level and/or a profile access level. Alternatively, fixed position device 200 may pass the request to service operator 816 so that the service-related information is provided by service operator 130 through steps 816 and 818.

At step 824, user device 110 receives the service-related information. The information may be displayed to the user. At step 826, user device 110 determines whether to proceed with the service negotiation, for example, based upon a user selection. If user device 110 determines not to proceed, then the negotiations are terminated at step 830. Otherwise, the process 800 proceeds to step 828 in which user device 110 initiates a new session with profile operator 115.

At step 832, user device 110 requests session-based User ID from profile operator 115. As previously discussed, and as shown in FIG. 8B, user device 110 may send the request directly to profile operator, such as by cellular, or may send the request via fixed position device 200 which passes the request to the profile operator at step 834.

Profile operator 115, in steps 836 and 838, receives the request for a User ID and generates a session-based User ID. At step 840, profile server 115 sends the User ID to user device 110. As shown, profile operator 115 may send the User ID directly to user device 110, such as by cellular, or may send the request via fixed position device 200 which passes the request to the user device at step 841. Thereafter, user device 110 receives the user ID at step 814. The user ID enables user device to conduct pseudonymous communications with service operator 130. Although user device 110 may employ the user ID for more than one session, a new user ID is preferably generated for each session to prevent a service operator from collecting any profile information on the user.

At step 844, user device initiates a service session profile capturing operation which involves tracking the behavior and/or activities of the user on user device 110. This may involve, for example, clickstream recording, device adaptation tracking, location tracking and context tracking. The profile information of the user may be updated with the tracked information.

The session continues at step 846, at which time, user device 110 determines whether the user has a pre-existing relationship with service operator 130, such as a service contract with the service operator. If a service contract exists, user device 110 sends a profile access level or authority, which reflects a previously agreed upon profile access level or authority, (e.g., a predefined viewpoint identifier) to service operator 130 at step 852 via fixed position device 110 at step 854. Along with the profile access authority, user device 110 may or may not send an identifier depending on the privacy level determined by the user device. In such as situation, user device 110 may send the session-based user ID or, alternatively, an authenticated ID.

At step 856, service operator 130 receives the profile access level or authority and some user identifier (if transmitted), and requests the user profile from profile operator 115. At step 858, profile operator 115 receives the request, and retrieves a subset of the user's profile information according to the authorized profile access level. Thereafter, profile operator 115 sends the user profile to service operator 130 at step 860, and may charge or bill the service operator a fee for the profile information at step 874.

At step 862, service operator 130 receives the subset of the user's profile information, and provides personalized service(s) to the user according to the received subset of the profile information. At step 876, service operator 130 may send user information relating to the session, e.g., user activity or behavior, to profile operator 115 automatically or upon request by the profile operator. Profile operator 115 may then update the user's profile information with the user information provided by the service operator 130, and may also compensate the service operator for such information. The compensation may take the form of a discount to the fee charged by profile operator 115 for providing profile information to service operator 130. The discount may be increased accordingly based upon the amount of updated information or the number of times updated information is provided by service operator 130.

Continuing at steps 864 and 866, user device 110 receives the personalized service(s), via fixed position device 200. At step 868, user device 110 terminates the session. At step 870, user device 110 may send tracked user information captured by the session profile tracking operation initiated at step 844 to profile operator 115. At step 872, profile operator 115 updates the user's profile accordingly based on the received information.

Returning to step 850 of FIG. C, the process 800 proceeds to step 880 to continue determine the privacy level if no pre-existing relationship exists between service operator 130 and the user. At step 882, user device 110 determines a profile access level or authority to the user's profile information based on a service category or content or any information provided by service operator 130, such as a requested viewpoint, etc. At step 883, user device 110 sends the determined profile access level or authority via fixed position device 200 (step 884). Along with the profile access authority, user device 110 may or may not also send an identifier depending upon the privacy level determined by the user device.

At step 885, service operator 130 receives the user ID and profile access level, and requests the appropriate user profile from profile operator 115. At step 886, profile operator 115 receives the request, and retrieves a subset of the user's profile information according to the authorized profile access level. Thereafter, profile operator 115 sends the user profile to service operator 130 at step 887, and may charge or bill the service operator a fee for the profile information at step 894.

At step 888, service operator 130 receives the subset of the user's profile information, and provides personalized service(s) to the user according to the received subset of profile information. At step 895, service operator 130 may send user information relating to the session, e.g., user activity or behavior, to profile operator 115 automatically or upon a request by the profile operator. Profile operator 115 may then update the user's profile information with the user information provided by the service operator 130, and may also compensate the service operator for such information. As discussed above, the compensation may take the form of a discount to the fee charged by profile operator 115 for providing profile information to service operator 130.

Continuing at steps 889 and 890, user device 110 receives the personalized service(s), via fixed position device 200. At step 891, user device 110 terminates the session. At step 892, user device 110 may send tracked user information captured by the session profile tracking operation initiated at step 844. At step 893, profile operator 115 updates the user's profile accordingly based on the received information.

Although the process 800 shows fixed position device 200 as facilitating the provision of services between service operator 130 and user device 110, this device may be considered a component of service operator 130 where it performs service functions for the service operator.

Furthermore, FIGS. 8A through 8D provide one illustrative example of the privacy and profile access features in a specific network arrangement embodiment employing Bluetooth technology. It is apparent that these operations may be implemented between the various parties, e.g., a user device, a profile operator and a service operator, over any communication medium employing different network environments and/or different wireless technologies.

For example, instead of distributing the service-related functions between service operator 130 and fixed position device 200, the fixed position device may be configured as a stand-alone fixed or mobile device (e.g., another person's Bluetooth-enabled device) capable of performing all the operations performed by service operator 130 as discussed above in regard to FIGS. 8A through 8D. The stand-alone mobile device may, for example, be service operator 140 as shown in FIGS. 1A and 1B in which user device 110 communicates with service operator 140 over a personal area network (PAN).

Alternatively, user device 110 may conduct communications with service operator 130 and profile operator 115 over a general packet radio system (GPRS) or general system for mobile communications (GSM) or other networks. At an initial stage, user device 110 may automatically or upon a user request send a request for service-related information (e.g., service category, service description, requested viewpoint, etc.) to service operator 130. The remaining operations performed by user device 110, service operator 130 and profile operator 115 thereafter would be similar to those discussed above in steps 826 through 893 of FIGS. 8A-8D.

Also, instead of determining the context or category through information provided by the service operator, the user device may employ the various context determination approaches as discussed herein to determine the context and, accordingly, control user privacy based on such context determination.

Various illustrative examples of the operation of system network 100 in different service environments will be described below. These examples include a shopping scenario, a meeting scenario, a medical emergency scenario, a health care scenario and a music bar scenario. As discussed above, the privacy level and profile access level provided by the user may vary depending on the nature of the services.

Shopping Scenario

In one example, a user operating a Bluetooth-enable user device 110 is shopping at a location (e.g., store, mall, etc.) having one or more fixed Bluetooth-enabled devices arranged at various locations within and/or in the vicinity of the shopping location. In this environment, the user may be provided services, such as information on sales or discounts on specific items, location of specific stores in the user's vicinity, advertising, and so forth based on the subset of the user's profile received from the profile server. Furthermore, the services may involve a transaction to purchase particular items. For transactions requiring payment by the user, the payment may be performed anonymously through a trusted third party, such as the user's profile operator.

Meeting Scenario

In one example, a user operating a Bluetooth-enable user device 110 attends a meeting at a location having one or more fixed Bluetooth-enabled devices arranged at various locations within and/or in the vicinity of the meeting location. In this environment, the user may be provided services, such as document and file delivery, information on other people attending the meeting and whether every person has arrived, and so forth. Furthermore, the services may also include voting at the meeting.

In a further example, a user operating a Bluetooth-enabled user device 110 attends a meeting in which one or more people also have a Bluetooth-enabled device. As the user approaches within communication proximity with another person's device, user device 110 establishes a communication link with the other person's device (or vice-versa), e.g., service operator, to form a personal area network (PAN). In this environment, the services may include access to the other person's assets, such as personal information, software including games, etc., documents, and so forth. Additionally, the services may involve scheduling a further appointment with the other person, and so forth.

Medical Emergency Scenario

In one example, a user operating a portable user device 110 is faced with a medical emergency. Through user device 110, the user can obtain services, such as medical consultation, directions to the closest hospital, calling for an ambulance, contacting the user's doctor and so forth.

Doctor/Health Care Scenario

In one example, a user operating a Bluetooth-enable user device 110 visits the office of his/her doctor. The doctor's office has one or more fixed Bluetooth-enabled devices arranged at various locations within and/or outside the office. In this environment, the user may be provided services, such as medical consultation, information relating to the doctor or doctor's office, information relating to whether the doctor is on schedule with his/her appointments, information relating to new medical treatments, advertising for drugs or new medical procedures, and so forth.

Furthermore, the services may also include transaction-related services, such as scheduling a follow-up doctor's visit, obtaining a drug prescription and so forth.

Music Bar Scenario

In one example, a user operating a Bluetooth-enable user device 110 enters a music bar having one or more fixed Bluetooth-enabled devices arranged at various locations within the bar. In this environment, the user may be provided services, such as information services which may include advertising, general information about the music bar (e.g., background information, bar layout, etc.), information on other people at the music bar, information on music being played, information on the identities of music performers as well as the music currently playing, played or to be played at the music bar, a schedule of performances, general statistical information as to the people at the bar (e.g., 15 single females, 13 single males, etc.), and so forth.

Additional services may also include transaction-related services, such as music downloads, purchasing tickets to music performances, purchasing food and beverages, and so forth. Transactions requiring payment by the user may be conducted through anonymous payment with the assistance of a trusted third party or profile operator 115 acting as a trusted third party. The services capable of being provided by the service operator may be related or unrelated to the music bar environment.

In a further example, a user operating a Bluetooth-enabled user device 110 enters a music bar in which one or more people also have a Bluetooth-enabled device. As the user approaches within communication proximity with another person's device, user device 110 establishes a communication link with the other person's device (or vice-versa), e.g., service operator, to form a personal area network (PAN). In this environment, the services may include access to the other person's assets, such as personal information, software including games, etc., documents, and so forth. Additionally, the services may involve playing a game with the other person over the personal area network, setting up a date with the other person and so forth.

While a specific communication arrangement is discussed in these illustrative scenarios, the service operator may provide the services to the user over any communication network arrangement, such as a personal area network (PAN), the Internet, wireless communication network or a combination thereof.

Figure 9:
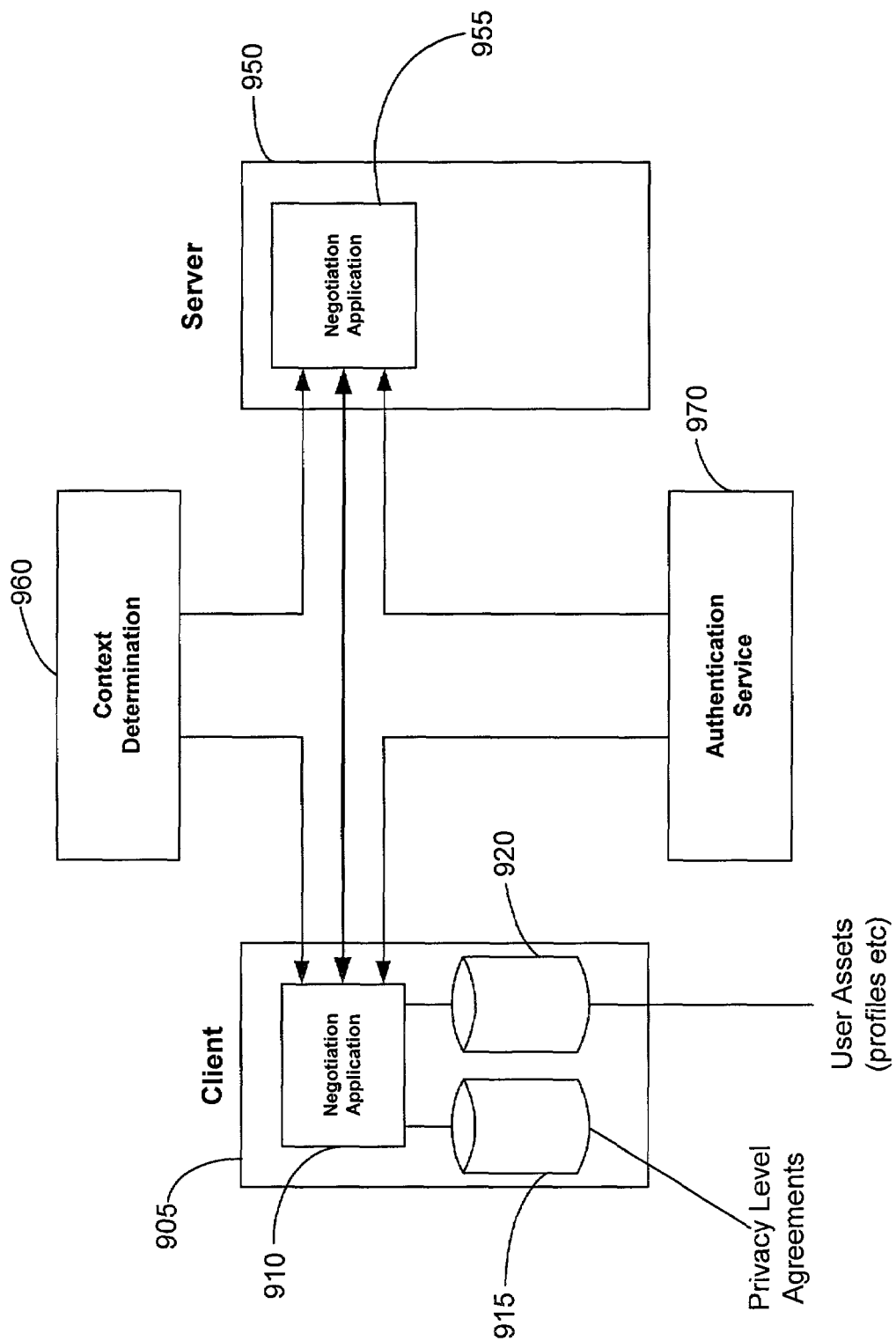
FIGS. 9 and 10 illustrate exemplary functional views of communications between a client and a server involving service negotiations and sessions.
Figure 10:
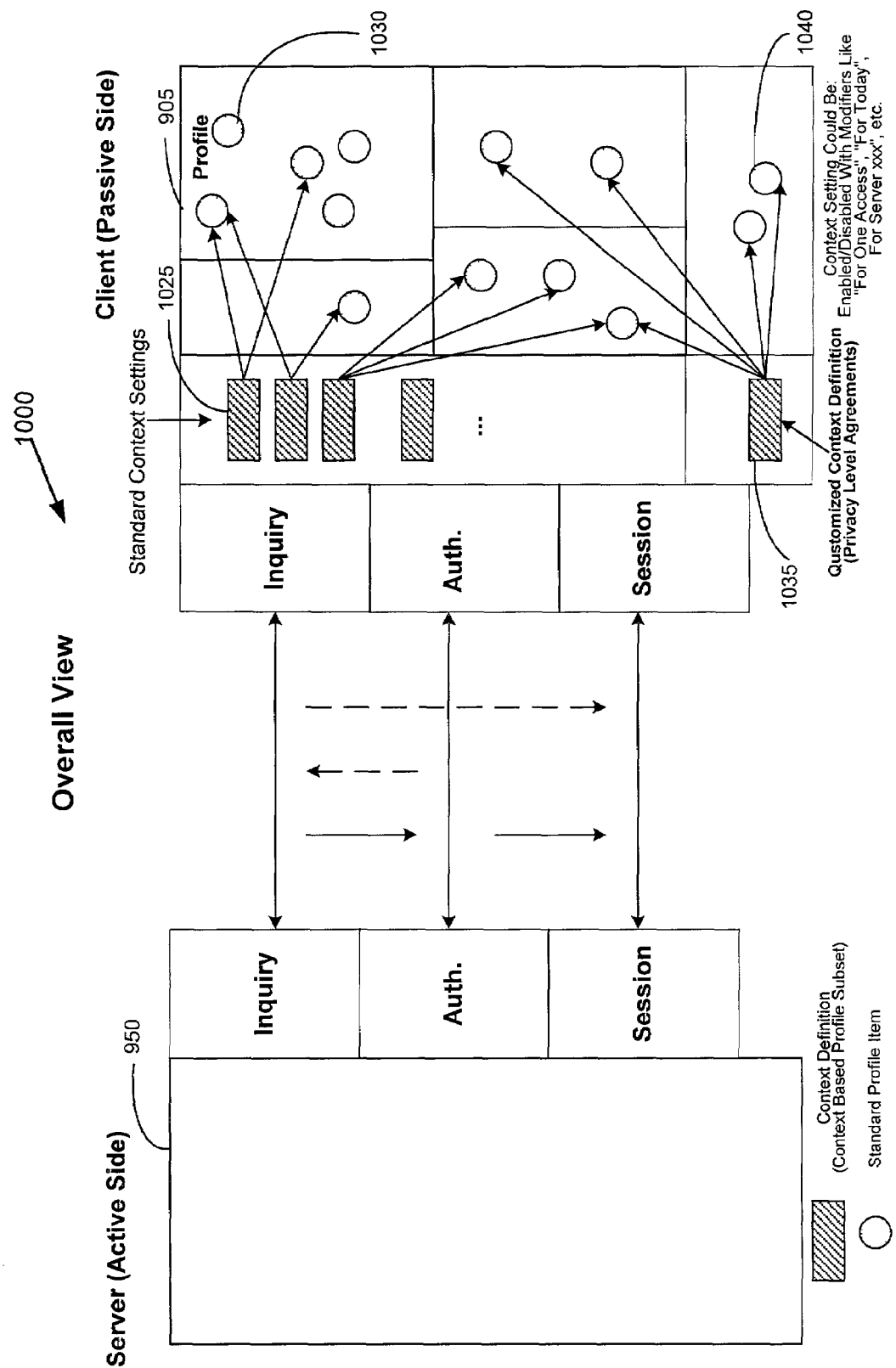

FIGS. 9 and 10 illustrate exemplary functional views of a privacy management approach involving communications of user information from a client 905 (e.g., user device 110 of FIG. 1A) to a server 950 (e.g., service operator 130, 140 of FIG. 1A), such as in service negotiations and service sessions, in accordance with one advantageous embodiment.

As shown, client 905 may include a negotiation application 910, a privacy level agreements database 915 and user assets database 920. Server 950 may also include negotiation application 950. Negotiation applications 910, 950 enable service negotiations to be conducted between the client and server, which may involve privacy level or anonymity level controls involving (if necessary) an authentication service 970, and inquiries and responses to inquires between the parties based on context determinations 960.

In terms of the flow of communications, FIG. 9 is simply provided to show how context may be employed as a mechanism to control user privacy, e.g., the level of anonymity (e.g., anonymous, pseudonymous, anonymous transaction, authenticated, etc.) of the client as well as the amount/type of user information to be provided by the client in service negotiations with the server. The context may be determined or predicted in various manners as discussed herein.

Authentication of the other party provides an additional layer of security to user privacy.

Referring to FIG. 10, an overall view of an example of a privacy network 1000 including an active side server 950 and a passive client 905 is illustrated. As shown, communication or interaction between server 950 and client 905 may involve inquiries and responses thereto and authentication of the parties (as desired). Depending on the outcome of the inquiries/response and authentication, server 950 and client 905 may initiate a service session.

To provide greater control over user privacy, client 905 may provide user information to server 905 based on the context or circumstances. Client 905 may employ predefined contexts or context settings, e.g., standard context 1025 or customized context 1035, to be employed as filter to reduce the amount/type of user information to be provided to server 950. The customized context settings are employed where an agreement exists with other parties to provide a predefined subset of user information. The standard settings may be the default context filters when an agreement does not exist between the communicating parties. Each context setting 1025, 1035 is associated with a subset or viewpoint of user assets or information (including profile information) 1030, 1040 respectively. The subset is preferably the minimal amount of user information necessary for a particular context. Accordingly, client 905 provides an appropriate subset or viewpoint of user information to the other party depending on the context.

Prior to any substantive provision of user information to server 950, client 905 may require authentication (as shown by reference to the dotted arrows) of the server, such as privacy enforcement certification of the server.

Figure 11:
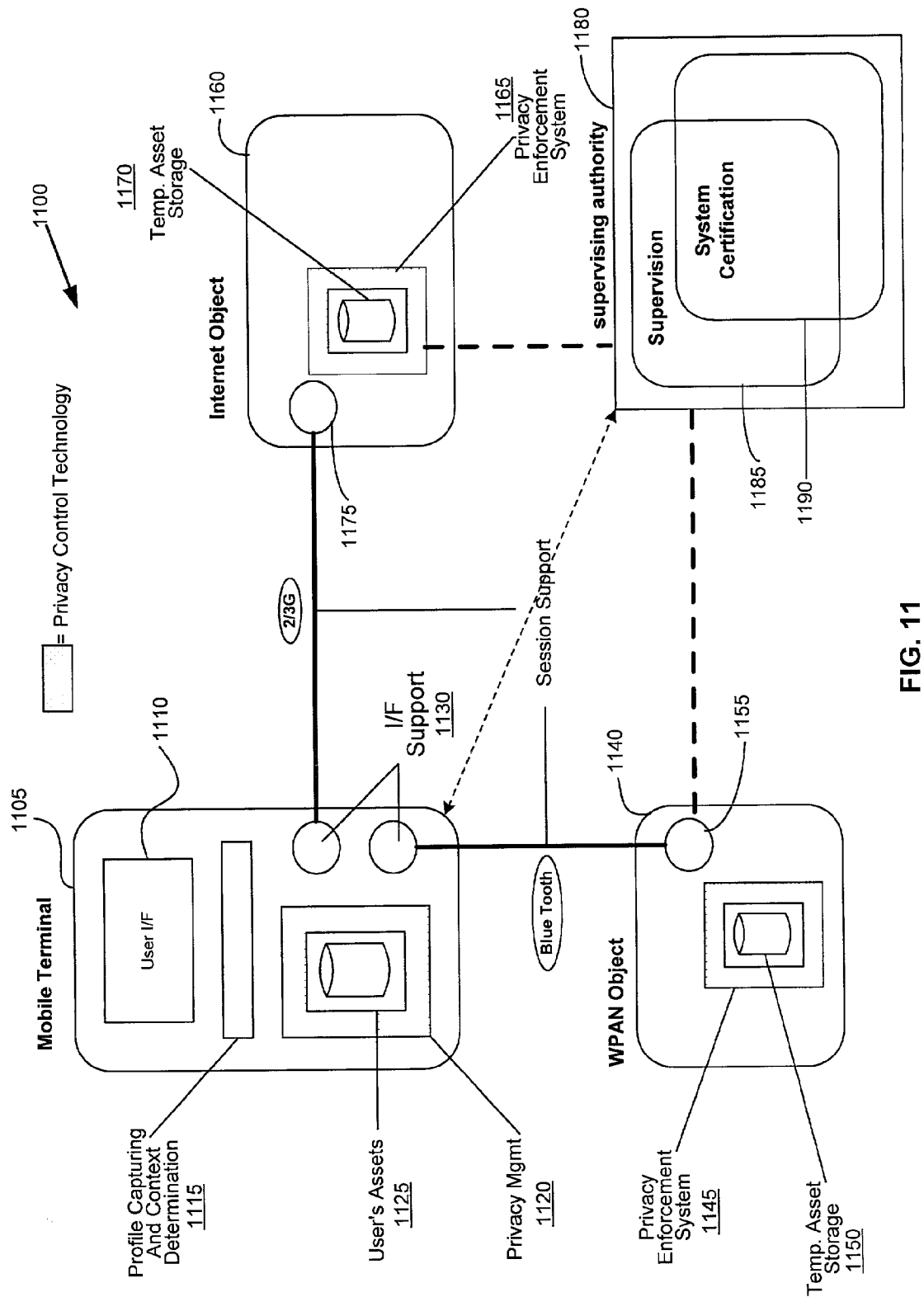
FIG. 11 illustrates an overview of a network system with an enforcement system for enforcing privacy using privacy enforcement system and a supervising authority that provide additional privacy control and management over the dissemination of user information in accordance with another advantageous embodiment.

FIG. 11 illustrates an overview of a network system 1100 employing privacy enforcement system and supervising authority to provide additional privacy control and management over the dissemination of user information prior to, during and after the provision of such information to another object, in accordance with another advantageous embodiment.

User device 1105 may be a wireless device (e.g., mobile terminal) including interface support 1130 to enable communications and service negotiations with other objects, such as a service provider, over various network mediums and protocols. For example, user device 1105, via interface support 1130, may interact with an Internet object 1170 over the Internet or with a personal area network (PAN) object over a personal area network.

User device 1105 may also include user interface (I/F) 1110, one or more application programs 1115 for profile capturing and context determination, user assets 1125, a privacy management application program 1120. The operations of the various components of user device 1105 including the various privacy controls are similar to those already discussed above for user device 110.

Objects 1140 and 1160 may be a fixed or mobile wireless device or a server or other computerized system, and include interface support 1155 and 1175, respectively, for communicating with, interacting with and receiving user information from user device 1105. Object 1140 and 1160 may include similar components and functionality as service operator 130 (discussed above). Objects 1140 and 1160 may include privacy enforcement systems 1145 and 1165, respectively, which maintain received user information in temporary asset storage 1150 and 1170, respectively, and include privacy enforcement application programs for controlling access to user information by the objects.

The privacy enforcement system may take the form of a "sealed black box" or a limited-access database for providing temporary storage of user information and enforcement application programs for controlling access including the usage, deletion, modification and update of the user information. For example, the "sealed black box" may include a black box firewall to prevent unauthorized access to user information. The enforcement application programs may be configured to control selectively access including usage, deletion, modification and update of received user information (from one or more parties) according to rights management rules of the user(s).

The rights management rules may include, for example, limiting access to a number of accesses (e.g., one time access, etc.), to a time duration or expiration (e.g., today, a week, etc.), to a particular party or parties (e.g., server xxx, John Smith, credit card authority, etc.), to a particular use (e.g., view only, no viewing, service personalization, update information, etc.) or to any other usage limitations or a triggering event, as desired. The rights management rules may further include deletion of the user information after a predetermined number of accesses, a predetermined duration, detection of impermissible use or violation of rights management rules, de-certification of the receiving party as a privacy enforcement certified (PEC), discussed below, or upon any other deletion rule or triggering event, as desired. The right management rules may be assigned or modified by contexts, viewpoints or user asset subsets, and may be provided along or attached with the user information sent to the receiving party or maintained by a supervising authority.

To provide additional security, the user information to be sent and the associated rights management rules may be encrypted and packaged together in an envelope by the user device and transmitted to the receiving party. The envelope may then be stored in temporary asset storage. The public key for decryption may be provided with the user information or at some other time by the user or by a trusted third party (e.g., a supervising authority) to enable the receiving party to decrypt the envelope.

For additional security, the privacy enforcement system as well as the temporary storage facility may be a physical device separated, but in communications with the receiving party. The privacy enforcement system may include additional security to sense or to detect or to block tampering or unauthorized access of the user information. This may involve, for example, disabling access temporarily or permanently to specific user information or all user information upon a detection of tampering or unauthorized access.

Supervising authority 1180 may take the form of any computerized system with communication means by which to conduct communications with an object to be supervised, such as objects 1140 and 1160, as well as with other objects (e.g., user device 1105). In various embodiments, supervising authority 1180 may take the form of a server or computerized system, with conventional components such as processor(s), memory, interfaces, operating system and so forth, which is configured to perform the methods and processes, such as supervision and certification, discussed herein.

Supervising authority 1180 may include a supervision subsystem 1185 for supervising access to user information of a user (e.g., such as the user of user device 1105) by others such as objects 1140 and 1160. Supervising authority may also include a certification subsystem to perform the functions of a Certification Authority (CA) to certify the trustworthiness of objects, such as objects 1140 and 1160, including the creation of digital certificates. These subsystems or the functions performed by them may be distributed among one or more systems, servers, network components, etc.

Regarding supervision, supervising authority 1180 may be a trusted third party which supervises the enforcement of the rights management rules on the user information maintained by one or more information receiving objects (also referred below as "receiving party"). The supervising authority may be provided with a communication link, such as an online connection, with the receiving party and/or the "sealed black box" or limited-access database. In this way, the supervising authority may monitor user information and accordingly, directly or indirectly, enforce the rights management rules or monitor the use and maintenance of user information by the receiving party.

For example, the supervising authority may be configured to perform the following:

(a) The supervising authority may supervise/monitor the maintenance and use of user information at a particular site, e.g., a receiving party.

(b) The supervising authority may delete user information according to the rights management rules associated therewith (e.g., after one access, after one day, etc.) as part of a housekeeping function. The supervising authority may check the user information and associated rights management rules to determine whether access rights have expired, at which time access to user information is disabled such as by deleting the information. This housekeeping function may be implemented upon a triggering event, such as at predetermined time intervals (e.g., each day, each week, etc.), upon user request, etc.

Likewise, the supervising authority may change or update the user information and/or rights management rules. These changes may be implemented based on a user request.

(c) The supervising authority may inform the user of the user information or status information at a particular site (e.g., a receiving party) automatically upon predefined triggering events (e.g., daily, weekly, violation of the rights management rules, etc.) or upon a user request. The status information may for example include the violation of any rights management rules, the expiration of access authority by the receiving party, the types of use of the user information (e.g., to provide personalized service, etc.), access history, tampering and so forth. Based on such status or the identification of the user information at a site, the user may request the supervising authority to delete, update or change the user information, to change the rights management rules, and so forth.

(d) The supervising authority may be informed by the privacy management system each time access to the user information is requested.

(e) The supervising authority may directly control the access of user information by the receiving party. For example, the privacy enforcement system may receive requests to access the user information and, accordingly, forward the request or the like to the supervising authority for approval. The supervising authority may then approve or deny the request based on the rights management rules and/or authentication of the receiving party. The approval or denial is communicated to the privacy enforcement system which acts accordingly to allow or deny the request. This communication may simply be an indication of approval or denial or may involve the provision of a public key to decrypt or gain access to the user information.

Alternatively, the privacy enforcement system may control access to the user information based on the rights management rules, with the supervising authority playing a monitoring role.

(f) The supervising authority may be configured to facilitate transfer of user information from the user device to a secure storage facility at the receiving party. For example, the supervising authority may receive the user information, contact the privacy management system at the receiving party, and forward the user information for storage.

Alternatively, the privacy management system at the receiving party may directly receive the user information from the user device for storage thereof.

Regarding certification, the supervising authority may also act as a third party or trusted certification authority (CA) which generates and provides certification or digital certificates to certify that a particular party is under the supervision of the supervising authority or some other supervising authority. This form of certification is generally referred herein as privacy enforcement certification (PEC), and a certified party is generally referred herein as being privacy enforcement certified. Such a certification provides a transmitting party with the security that a party requesting information is under supervision by a trusted party.

Accordingly, during communications between two or more parties, such third party certificates may be exchanged and verified to ensure that the parties are privacy enforcement certified. Such authentication may be a prerequisite to conducting a session with any receiving party or generally to transmitting user information to any receiving party.

Generally, the use of digital certificates provides another layer of privacy control in addition to the encryption of data. Digital certificates may be employed in the context of encryption on the Internet to establish authenticity of public keys, thereby ensuring that a given public key in fact belongs to the person purportedly associated therewith. This mechanism requires a trusted third party or "certification authority" (CA) responsible for checking each purported owner's claim to the published public key, i.e., requiring some proof of identification of persons publishing and posting public keys for purposes of encryption on the Internet. The certification authority then adds its digital signature to the public key and this, in effect, validates the public key. Compatibility, therefore, is necessary for wide spread and effective use of such digital certificates. Digital certificates issued by different certification authorities should be compatible in a context of encryption and decryption on a global communications network, e.g., the Internet. Software used to check and certify public keys must reference some standard protocol to be universally effective. One standard form for digital certificates is commonly referred to as the "X.509" standard. This standard was originally part of a "X.500" series of standards, but has been extended to embrace a wide variety of Internet services such as E-mail, worldwide web protocols, user authentication, and electronic commerce.

Various authentication/certification mechanism may be employed, such as secure socket layer (SSL), Kerebos, and so forth. For example, SSL is a general-purpose cryptographical protocol for securing bidirectional communication channels. SSL is commonly used with the TCP/IP Internet protocol. SSL is the encryption system that is used by web browsers such as Netscape Navigator and Microsoft's Internet Explorer, but can be used with any TCP/IP service. SSL connections are usually initiated with a web browser through the use of a special URL prefix (e.g., "http:", etc.). SSL offers confidentiality through the use of user-specified encryption algorithms; integrity through the use of user-specified cryptographic hash functions; authentication, through the use of X.509 v3 public key certificates; and nonrepudiation through the use of cryptographically signed messages.

Figure 12:
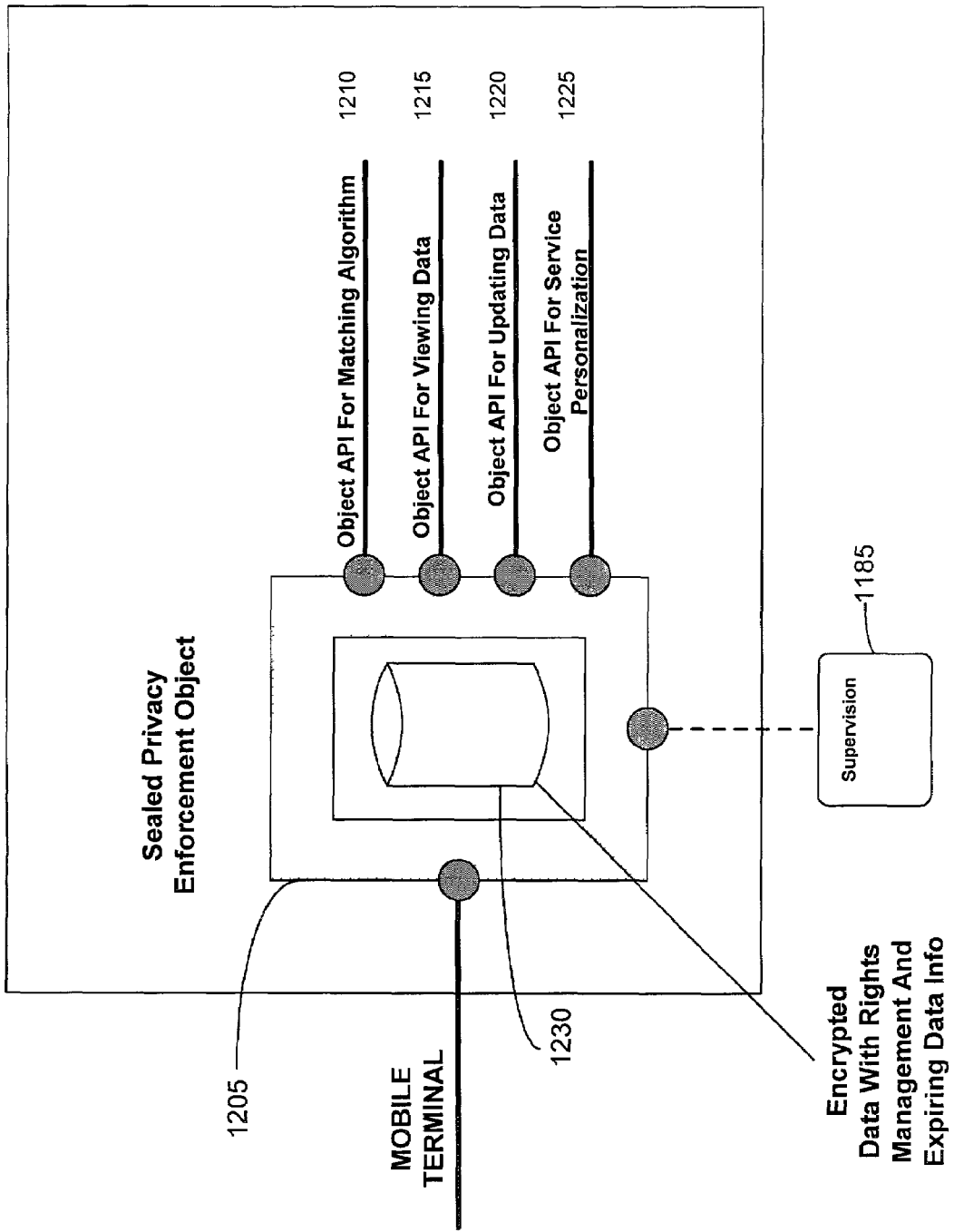
FIG. 12 illustrates an exploded view of exemplary privacy enforcement system interacting with application program interface layers requesting use of user information to control access to user information.

FIG. 12 illustrates an exploded view of privacy enforcement system 1205 to control access to received user information maintained in asset storage 1230. As shown, privacy enforcement system 1205 is in communication with supervision subsystem of a supervising authority to enable such authority to ensure, directly or indirectly, the privacy of user information. Privacy enforcement system 1205 also interacts with various application program interfaces (API), e.g., Matching Algorithm API 1210, Viewing Data API 1215, Updating Data API 1220 and Service Personalization API 1225, etc., of an object which may request user information for specific uses. Privacy enforcement system 1205 provides a security layer to control the access of the user information by the object according to the right management rules associated with the user information.

For example, user information may have rights management rules allowing for use in service personalization, but prohibiting viewing. As such, requests for user information from an API for service personalization would be allowed, whereas requests for user information from an API for viewing would be denied.

Figure 13:
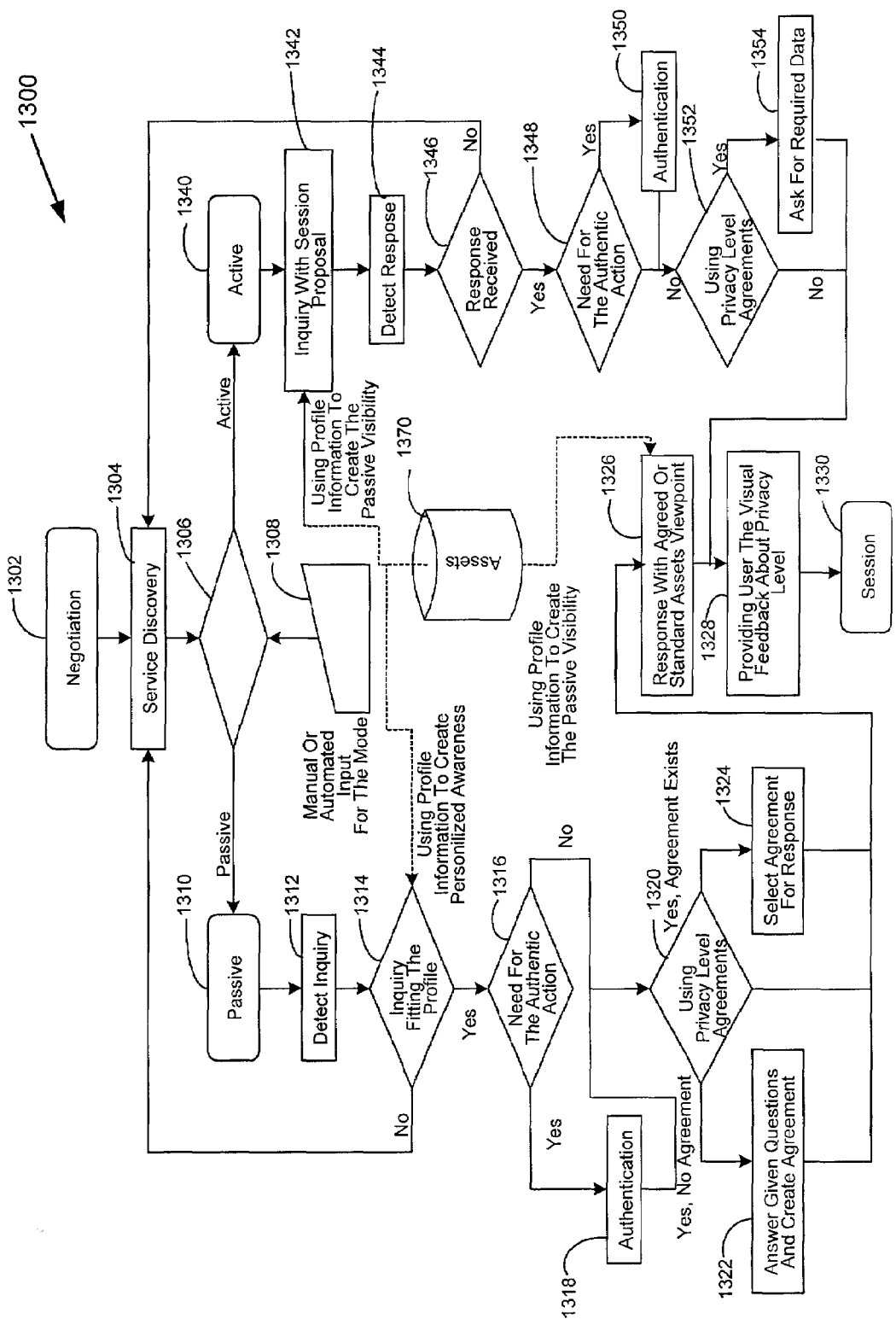
FIG. 13 illustrates an exemplary process by which privacy of a user's identity and assets is controlled during a service negotiation and a service session with another party, such as a service operator in accordance with an advantageous embodiment.

FIG. 13 illustrates an exemplary process 1300 by which privacy of a user's identity and assets is controlled or managed by a user device (e.g., user devices 110, 1105) during and after communications, such as in a service negotiation and a service session, with another party such as a service operator in accordance with an advantageous embodiment. The process will be explained with reference to FIGS. 1A and 9-12.

The process begins at step 1302 in which a user device operates in a service negotiation mode which may involve, for example, setting up a service session between two objects (e.g., mobile terminal and service provider). At step 1304, the user device initiates a service discovery function or operation to detect service opportunities. The service discovery function may involve, for example, detection, authentication and filtering.

At step 1306, the user device determines which detection mode of operation to perform, e.g., active or passive. The user device may operate in an active detection mode or passive detection mode automatically or upon a manual input based on user command, on the context or circumstances, on predefined rules or triggering events and so forth, as shown by reference to reference numeral 1308.

If the user device is set to perform passive mode detection, then the process proceeds to step 1310. With passive detection, the user device checks the environment for inquires and responds to detected inquires as necessary. For example, at step 1312, the user device detects inquiries, such as service opportunity inquires. At step 1314, the user device determines whether a detected inquiry matches one or more predetermined service profiles based on profile information from user's assets 1370. For example, profile information may be utilized to create personalized awareness.

If the detected inquiry does not match any profiles, then the process returns to step 1304 in which service discovery is continued or terminated, as desired.

If the detected inquiry matches one or more service profiles, then the user device determines whether authentication needs to be conducted at step 1316. Authentication may be conducted based on the context or circumstances or user input or default settings. For example, services involving financial services, such as banking services, may require authentication by both parties (e.g., the user and the banking service). Accordingly, the need for authentication may also be dependent on the nature of the user profile information to be provided to the other party. Additionally, the user device may be configured to conduct authentication automatically or manually as desired by the user. The authentication process may also involve privacy enforcement certification check (PECC) to ensure that the parties are privacy enforcement certified (PEC), as discussed herein.

If authentication is required, the process proceeds to step 1318 in which authentication is performed. Authentication may be performed through use of a trusted third party, through the passing of certificates and appropriate keys, and so forth to validate the identities of the parties as well as data transmitted by the parties.

In either cases, the process proceeds to step 1320 in which the user device determines whether privacy level agreements (e.g., service contracts) exist between the user and the other party. If no agreement, the user device answers any given queries or questions from the other party and creates an agreement with the other party. At step 1326, the user device thereafter responds with a standard assets viewpoint or subset from user assets 1370 according to the context of the communications or an agreed upon asset viewpoint or subset pursuant to a privacy level agreement. Such an arrangement employs profile information of the user to create passive visibility.

At step 1328, the user device provides the user with some indication or feedback identifying a privacy level at which communications is conducted with the other party. For example, the indication may be visual, such as different colors for different privacy levels, different icons for different privacy levels, different graphical shapes or representations or any visual manner that informs a user of a specific privacy level at which communications is to be performed. The indication may also take other forms (e.g., sensory forms) by which a user may be informed, such as audio, etc. At this time as well as any time throughout the processes, the user may terminate communications with the other party.

Thereafter, in step 1330, the user may conduct a session with the other party. As discussed above, this may involve additional queries for information by the other party as well as the provision of services by the other party. As such, a session may involve multiple privacy level determinations by the user device and responses with different asset viewpoints depending on the nature of the transaction. The user may terminate the session at any point, as desired.

Turning back to step 1304, in the event the user device is set to perform active detection, the process proceeds to step 1340 in which the user device operates in the active detection mode. Active detection may be employed in an environment having passive objects (e.g., passive parties, etc.). For example, the user device may operate in the active detection mode when entering into particular contexts, such as a meeting room scenario, so as to "wake up" other parties or facilities.

At step 1342, the user device transmits an inquiry with a session proposal and detects for a response to the inquiry at step 1344. The inquiry may include sufficient information to enable the other party to decide whether or not to respond to the inquiry and also requests for information (e.g., some profile information from the other party or parties receiving the inquiry). The information transmitted may be based on a determined context. At step 1346, the user device determines whether a response was received. The determination may be made at a predetermined time period after the transmission of an inquiry (e.g., after a predetermined time has elapsed), pursuant to a user command, or upon a triggering event.

If a response has not been received, then the process returns to step 1304 in which service discovery is continued or terminated, as desired. Otherwise, in the event of a response by another party, then the user device determines whether authentication needs to be conducted at step 1348. Authentication may be conducted based on the context of the communications. For example, services involving financial services, such as banking services, may require authentication by both parties (e.g., the user and the banking service). Accordingly, the need for authentication may also be dependent on the nature of the user profile information to be provided to the other party. Additionally, the user device may be configured to conduct authentication automatically or manually as desired by the user. The authentication process may also include privacy enforcement certification check (PECC) to ensure that the parties are privacy enforcement certified (PEC), as discussed above.

If authentication is required, the process proceeds to step 1350 in which authentication is performed. Authentication may be performed through use of a trusted third party, through the passing of certificates and appropriate keys, and so forth to validate the identities of the parties as well as data transmitted by the parties.

In either cases, the process proceeds to step 1352 in which the user device determines whether privacy level agreements (e.g., service contracts) exist between the user and the other party. If an agreement exists, the user device requests the required data from the other party at step 1354.

In either case, at step 1328, the user device provides the user with some indication or feedback identifying a privacy level at which communications is conducted with the other party. For example, the indication may be visual, such as different colors for different privacy levels, different icons for different privacy levels, different graphical shapes or representations or any visual manner that informs a user of a specific privacy level at which communications is to be performed. The indication may also take other forms (e.g., sensory forms) by which a user may be informed, such as audio, etc. At this time as well as any time throughout the processes, the user may terminate communications with the other party. Thereafter, in step 1330, the user may conduct a session with the other party.

Figure 14:
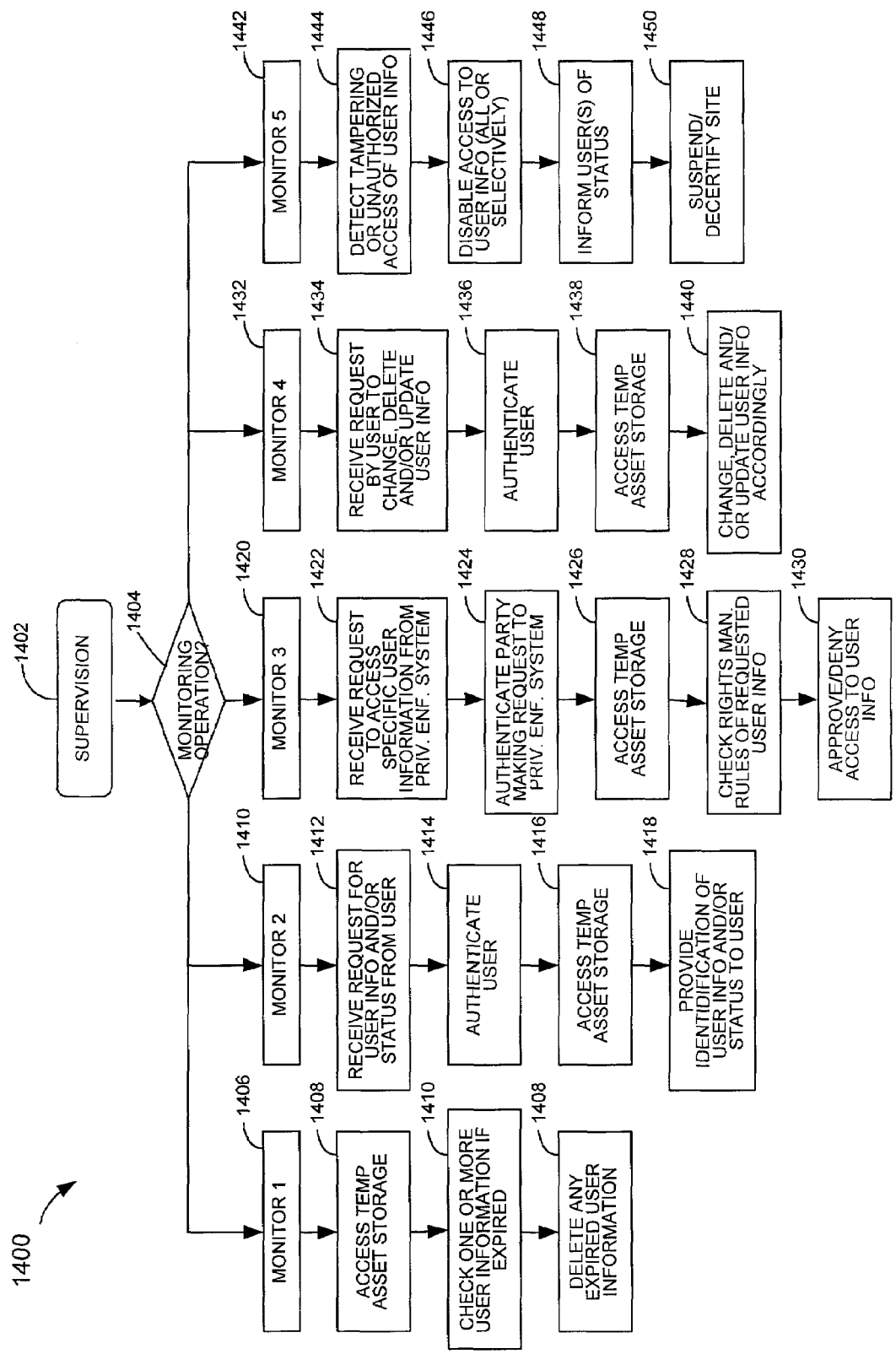
FIG. 14 illustrates an exemplary process by which a supervising authority supervises/monitors user information in accordance with an advantageous embodiment.

FIG. 14 illustrates an exemplary process 1400 by which a supervising authority monitors user information at a receiving site (e.g., user information/assets maintained at a receiving party) in accordance with an advantageous embodiment. The process begins at step 1402 in which the supervising authority initiates a supervision mode. At step 1404, the supervising authority determines which monitoring process to implement, such as Monitor-1 process at step 1406, Monitor-2 process at step 1410, Monitor-3 process at step 1420, Monitor-4 process at step 1432 or Monitor-5 process at step 1442. This decision may be based on various factors, such as requests from other parties, e.g., a user, a receiving party (such as the party which has received the user information) or a privacy management system at a site, or some triggering event or manual command. Each Monitor process will now be discussed below.

Regarding the Monitor-1 process (step 1406), the supervising authority accesses temporary asset storage at the receiving site at step 1408 and checks whether access rights to user information has expired at step 410. In other words, the supervising authority checks the rights management rule associated with each user information to ascertain whether access rights to any of the user information maintained at the site has expired or terminated. If so, the supervising authority deletes user information in which the access rights have expired or terminated or revokes the access rights to such user information.

Regarding the Monitor-2 process (step 1410), the supervising authority receives a request from a user to identify his/her user information maintained at a receiving site and/or to provide a status report on such information at step 1412. At step 1414, the supervising authority authenticates the identity of the user to ensure that the object attempting to obtain information on particular user information is entitled to do so. If not, the supervising authority terminates the process. Otherwise, at step 1416, the supervising authority accesses temporary asset storage at the receiving site to identify user information of the user and/or the status of such user information. The status information may for example include the violation of any rights management rules, the expiration of access authority by the receiving party, the types of use of the user information (e.g., to provide personalized service, etc.), access history, and so forth.

At step 1418, the supervising authority provides the identification information and/or status information to the user device that may display such information to the user. Based on such status or the identification of the user information at a site, the user may request the supervising authority to delete, update or change the user information, to change the rights management rules, and so forth.

Regarding the Monitor-3 process (step 1420), the supervising authority receives a request to access specific user information from the privacy enforcement system at the receiving site at step 1422. At step 1424, the supervising authority authenticates the object initiating the request to the privacy enforcement system to ensure that the object attempting to obtain information on particular user information is entitled to do so. Alternatively, this may be performed by the privacy enforcement system. If the identity is authenticated, the supervising authority accesses the temporary asset storage at the receiving site at step 1426 and checks the right management rules for the specific requested user information at step 1428. At step 1430, the supervising authority accordingly approves or denies the request according to the rights management rules.

The approval or denial is communicated to the privacy enforcement system which acts accordingly to allow or deny the request. This communication may simply be an indication of approval or denial or may involve the provision of a public key to decrypt or gain access to the user information. Alternatively, the privacy enforcement system may control access to the user information based on the rights management rules, with the supervising authority playing a general monitoring role.

Regarding the Monitor-4 process (step 1432), the supervising authority receives a request from a user to change, delete and/or update user information at step 1434. At step 1436, the supervising authority authenticates the identity user to ensure that the object attempting to access the particular user information is entitled to do so. If not, the supervising authority terminates the process. Otherwise, the supervising authority accesses temporary asset storage at the receiving site at step 1438 and changes, deletes and/or modifies the specific user information according to the user's request at step 1440. This may include changing the rights management rules for the user information.

Regarding the Monitor-5 process (step 1442), the supervising authority monitors the receiving site and detects tampering or unauthorized access of specific user information at a receiving site at step 1444. At step 1446, the supervising authority, in combination with the privacy enforcement system, may disable, temporarily or permanently, access to the specific user information or all user information at the receiving site. Permanent disablement may involve deletion of the user information or revocation of access rights. Thereafter, at step 1448, the supervising authority notifies the user(s) of the status, e.g., tampering or unauthorized access. At step 1450, the supervising authority may suspend or decertify the receiving site or party and inform users of such suspension or de-certification.

While the above describes various examples of supervision functions performed by the supervising authority, other supervision functions or non-supervision functions may also be implemented by the supervising authority. For example, as discussed herein, the supervising authority may also be a Certification Authority (CA) to provide digital certificates, such as privacy enforcement certificates (PEC). The supervising authority may perform other supervision functions involving the general maintenance and rights enforcement of user information at a receiving site.

FIG. 15 illustrates an exemplary transaction log 1500 maintained or employed by a user device. Transaction log 1500 may include an object identifier field 1505, transaction date/time field 1510, viewpoint field 1515 and a supervising authority identifier field 1520. While the various fields and information are self-explanatory, a brief discussion of the database is provided below.

Object identifier field 1505 maintains information identifying an object that has received user information from the user at some point in time.

Transaction date/time field 1510 maintains information identifying a date and/or time when user information was provided to an object.

Viewpoint identifier field 1515 maintains information identifying the user information transferred to an object according to the viewpoint, context, category, etc.

Supervising authority identifier field 1520 maintains information identifying a supervising authority of the transferred user information or of the object and, if desired, the contact information (e.g., electronic address) for the supervising authority.

By maintaining such a log, the user can identify which objects have user information, the types/amount of user information those objects receives and the supervising authorities supervising access to the user information. This may enable the user to identify the possible sources from which specific user information may have been leaked. This also enables the user to contact the appropriate supervising authority to request identification of its user information that an object has received and/or stored and the status thereof, so as to change, delete or update its user information and so forth.

While transaction log 1500 is shown as being accessed according to object identifier field 1505, the information in the log may be accessed according to other fields, such as fields 1510, 1515 and 1520. Furthermore, transaction log 1500 is shown in table format simply for the purpose of illustration and may take the form of any database format employing different labels, as desired.

Although specific embodiments of the invention have been disclosed, it will be understood by those having skill in the art that changes can be made to the specific embodiments without departing from the spirit and the scope of the invention.

What is claimed is:

1. A method of managing user privacy of a user operating a user device in a network environment, comprising:
communicating with a party via the user device across the network environment;
determining a context for interaction between the user via the user device and the party;
filtering user data to be provided to the party based on the determined context; and
transmitting the filtered user data to the party,
wherein the context is automatically determined based upon an environment of the user device and the transmitting transmits the filtered user data from the user device to the party,
wherein the context is determined based on information received from one or more sensors, and the one or more sensors are selected from the group consisting of positioning sensor, touch sensor, audio sensor, compass sensor, ambient light sensor, ambient temperature sensor or three-axis acceleration sensor.

2. The method according to claim 1, wherein the user data comprises personal assets of the user.

3. The method according to claim 1, wherein the user device is a wireless device.

4. The method according to claim 1, wherein the context is determined based on a pattern of prior actions by the user.

5. The method according to claim 4, wherein the pattern comprises one of transactional history, habit, predisposition and profile of the user.

6. The method according to claim 1, wherein the context is based on information provided by the party.

7. The method according to claim 6, wherein the information provided by the party includes one of a service category, a service description, a requested viewpoint and an identity of the party.

8. The method according to claim 1, wherein the context is determined based on information provided by a context beacon in a vicinity of the user.

9. The method according to claim 1, wherein the context is determined based on an agreement between the user and the party.

10. The method according to claim 9, wherein the agreement defines a subset of user data to be provided to the party.

11. The method according to claim 9, further comprising:
maintaining context definitions comprising standard context definitions and customized context definitions, the customized context definitions defining one or more privacy level agreements between the user and one or more parties,
wherein the determining a context operation further includes:
determining whether a privacy level agreement exists between the user and the party, and
determining a context from the context definitions based on whether a privacy level agreement exists.

12. The method according to claim 1, wherein the filtering of user data further comprises predefining contexts which are associated with one or more predefined subsets of the user data.

13. The method according to claim 1, further comprising:
determining an anonymity level at which interaction with the party is to be conducted; and
interacting with the party at the determined anonymity level.

14. The method according to claim 13, wherein the anonymity level is selected from one of Anonymous, Pseudonymous, Anonymous transaction and Authenticated.

15. The method according to claim 1, further comprising:
authenticating whether the party is under supervision by a trusted supervising authority, the supervising authority supervising enforcement of access rights to user data received by the party; and
providing user information to the party if the party is authenticated as being one under the supervision of the supervising authority.

16. The method according to claim 15, wherein the authenticating comprises:

receiving a privacy enforcement certificate associated with the supervising authority from the party; and verifying the authenticity of the privacy enforcement certificate.

17. The method according to claim 1, wherein rights management rules defining access rights by the party are associated with the filtered user data provided to the party.

18. The method according to claim 17, wherein the rights management rules are attached with the filtered user data provided to the party.

19. The method according to claim 17, wherein the rights management rules define access limitations selected from the group consisting of a number of accesses, a time duration or expiration, a particular party and a particular use.

20. The method according to claim 17, wherein the rights management rules define when the filtered user data is to be deleted.

21. The method according to claim 20, wherein the filtered user data provided to the party is to be deleted upon one of a predetermined number of accesses, a predetermined time duration, detection of impermissible use, detection of a violation of rights management rules and de-certification of the party as privacy enforcement certified.

22. The method according to claim 1, further comprising maintaining a log of user data provided to the party.

23. The method according to claim 1, wherein user data has rights management rules associated therewith defining access rights to user data and a supervising authority supervises enforcement of the rights management rules over user data received by the party.

24. The method according to claim 1, wherein the transmitting transmits the filtered user data to the party during interaction between the user via the user device and the party.

25. The method according to claim 1, wherein the context is automatically determined from a plurality of predefined contexts based upon an environment of the user device.

26. A computer-readable medium encoded with processing instructions for implementing a method of managing user privacy of a user operating a user device in a network environment, performed by a computer, the method comprising:

communicating with a party via the user device across the network environment;

determining a context for interaction between the user via the user device and the party;

filtering user data to be provided to the party based on the determined context; and transmitting the filtered user data to the party, wherein the context is automatically determined based upon an environment of the user device and the transmitting transmits the filtered user data from the user device to the party, wherein the context is determined based on information received from one or more sensors, and the one or more sensors are selected from the group consisting of positioning sensor, touch sensor, audio sensor, compass sensor, ambient light sensor, ambient temperature sensor or three-axis acceleration sensor.

27. The computer-readable medium encoded with processing instructions for implementing a method of managing user privacy of a user operating a user device in a network environment, performed by a computer, according to claim 26, wherein the transmitting transmits the filtered user data to the party during interaction between the user via the user device and the party.

28. A method of managing user privacy of a user operating a user device in a network environment, comprising:

maintaining context definitions comprising standard context definitions and customized context definitions, the customized context definitions defining one or more privacy level agreements between the user and one or more parties;

communicating with a party via the user device across the network environment;

determining whether a privacy level agreement exists between the user and the party;

determining a context from the context definitions based on whether a privacy level agreement exists;

filtering user data to be provided to the part based on the determined context; and transmitting the filtered user data to the party, wherein the context is determined based on information received from one or more sensors, and the one or more sensors are selected from the group consisting of positioning sensor, touch sensor, audio sensor, compass sensor, ambient light sensor, ambient temperature sensor or three-axis acceleration sensor.

29. The method according to claim 28, wherein the determining a context operation selects a context from the maintained customized context definitions if a privacy level agreement exists between the user and the party.

30. The method according to claim 28, wherein the determining a context operation selects a context from the maintained standard context definitions if a privacy level agreement exists between the user and the party.

31. A communications device of a user, comprising:

a communications interface for communicating with a party across a network environment;

a memory; and a processor that executes instructions stored in the memory for:

determining a context for interaction with the party, the context being automatically determined based upon an environment of the communications device;

filtering user data to be provided to the party based on the determined context; and transmitting the filtered user data to the party, wherein the context is determined based on information received from one or more sensors, and the one or more sensors are selected from the group consisting of positioning sensor, touch sensor, audio sensor, compass sensor, ambient light sensor, ambient temperature sensor or three-axis acceleration sensor.

* * * * *